(12) United States Patent
Imoto

(10) Patent No.: US 7,035,518 B2
(45) Date of Patent: Apr. 25, 2006

(54) POLYMER WAVEGUIDES AND PROCESS FOR PRODUCING THE SAME

(75) Inventor: Katsuyuki Imoto, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 292 days.

(21) Appl. No.: 10/102,963

(22) Filed: Mar. 22, 2002

(65) Prior Publication Data

US 2002/0150368 A1   Oct. 17, 2002

(30) Foreign Application Priority Data

Apr. 13, 2001  (JP)  ............... 2001-115660
Apr. 13, 2001  (JP)  ............... 2001-115661

(51) Int. Cl.
  *G02B 6/10*  (2006.01)
(52) U.S. Cl. .................... 385/132; 385/131
(58) Field of Classification Search ............. 385/132, 385/143, 145, 131; 430/269
See application file for complete search history.

(56) References Cited

U.S. PATENT DOCUMENTS

| | | |
|---|---|---|
| 5,370,906 A | 12/1994 | Dankert |
| 5,612,103 A | 3/1997 | Driehuys et al. |
| 5,633,312 A * | 5/1997 | Kabeta et al. ............ 528/14 |
| 5,672,672 A | 9/1997 | Amano et al. |
| 5,702,776 A * | 12/1997 | Hayase et al. ............ 428/1.32 |
| 5,802,233 A * | 9/1998 | Sugi et al. ............ 385/122 |
| 6,337,163 B1 * | 1/2002 | Sato ............ 430/30 |
| 6,365,698 B1 | 4/2002 | Goldslager et al. |
| 6,503,421 B1 * | 1/2003 | Wang et al. ............ 252/582 |
| 6,611,651 B1 * | 8/2003 | Ogawa et al. ............ 385/143 |
| 6,654,535 B1 * | 11/2003 | Teramoto et al. ............ 385/132 |
| 2001/0031122 A1 * | 10/2001 | Lackritz ............ 385/131 |
| 2003/0207215 A1 * | 11/2003 | Xu et al. ............ 385/131 |

FOREIGN PATENT DOCUMENTS

| | | |
|---|---|---|
| EP | 0 725 315 A2 | 1/1996 |
| JP | 6-222234 | 8/1994 |
| JP | 8-262728 | 10/1996 |
| JP | 11-72808 A * | 3/1999 |
| JP | 11-287916 | 10/1999 |

* cited by examiner

*Primary Examiner*—Jared J. Fureman
(74) *Attorney, Agent, or Firm*—Foley & Lardner LLP

(57) ABSTRACT

In a polymer waveguide comprising a cladding layer with a low refractive index and a core layer with a high refractive index of a substantially rectangular section covered with the cladding layer, the core layer and a side cladding layer constituting the cladding layer in its portion located on both sides of the core layer are formed of a material comprising a branched polysilane compound containing a silicone compound. By virtue of this constitution, the polymer waveguide has a low loss and causes no significant change in optical characteristics upon a change in ambient temperature.

12 Claims, 18 Drawing Sheets

POLYMER WAVEGUIDES AND PROCESS FOR PRODUCING THE SAME

BACKGROUND OF THE INVENTION

1. Field of the Invention

The invention relates to polymer waveguides in which a core layer and a cladding layer each formed of a polymer material and the interface between the core layer and the cladding layer can be evenly formed with good adhesion between the core layer and the cladding layer and a cladding layer having even thickness can be formed on the core, and a process for producing the same.

2. Prior Art

Polymer waveguides have features including that they can be produced in a simple manner, the area can be easily increased, and the cost could be lowered. By virtue of these features, polymer waveguides are expected to be put to practical use.

For example, acrylic, polystyrene, epoxy, polyimide, silicone, and polysilane materials have been studied as materials for polymer waveguides. These materials are desired to be less likely to undergo a change in characteristics, for example, refractive index or coefficient of thermal expansion, upon a change in temperature.

In view of the above requirements, among the above polymer materials, polyimide, epoxy, and polysilane materials have drawn attention, and an improvement in these polymer materials has been attempted.

Examples of attempts include, for example, the use of a linear (straight-chain) polysilane material for optical applications as shown in FIG. 1 (see Japanese Patent Laid-Open No. 222234/1994), the use of amorphous polysilane (see Japanese Patent Laid-Open No. 287916/1999), and the use of linear polysilane or branched polysilane (see Japanese Patent Laid-Open No. 262728/1996).

FIG. 1 is a perspective view of the appearance of a polymer waveguide using a linear polysilane material.

In FIG. 1, numeral 50 designates a core of methylphenylpolysilane, and numeral 51 a cladding of polysiloxane.

The above prior art techniques, however, involve the following problems.

(1) The refractive index significantly changes upon a change in ambient temperature. This in turn leads to a significant change in optical characteristics (such as propagation mode, power distribution, and wavelength characteristics) of optical circuits comprising polymer waveguides using the above polymer material and thus makes it impossible to provide desired properties.

(2) In soldering an electronic component or an optical component to a portion around the polymer waveguide at a temperature around 200° C., the refractive index of the polymer waveguide is disadvantageously changed from the initial value to a value different from the initial value, and, even when the temperature is returned to ambient temperature, the refractive index of the polymer waveguide cannot be returned to the initial value. This leads to a change in optical characteristics of the optical circuit comprising the polymer waveguide as described in the above item (1).

(3) A method for forming a three-dimensional waveguide by applying ultraviolet light to a film using a linear polysilane material has been proposed. This method, however, involves the above problems (1) and (2) and, in addition, for example, a problem of the dependency of refractive index upon polarized light, and thus has not been put to practical use yet. Further, even when an attempt is made to cause a significant change in refractive index of the polymer film through the application of ultraviolet light with quick response, a change in refractive index is discontinuous in relation to irradiation energy. In addition, in order to achieve a significant change in refractive index, the level of irradiation energy should be enhanced.

(4) A polymer waveguide is generally prepared as follows. A solution of a polymer material, comprising a polysilane compound for a core with a high refractive index, in an organic solvent is spin coated onto a buffer layer with a low refractive index. The coating is then heat treated at a solder reflow temperature (a temperature of 250 to 300° C.) to cure the coating and thus to form a polymer layer with a high refractive index. A solution of a polymer material, for a cladding with a low refractive index, in an organic solvent is coated onto the polymer layer, and the coating is then heat treated at a solder reflow temperature. In this case, when the heat treatment of the coating for the cladding is started, disadvantageously, the polymer material solution for the cladding is repelled by the surface of the polymer layer for the core resulting in uneven surface of the cladding, or otherwise the transparency of the underlying polymer layer for the core is lost. This increases light scattering loss.

(5) The cladding layer formed by the method described in the above item (4) is likely to be separated upon the heat treatment, that is, has poor adhesion.

SUMMARY OF THE INVENTION

Accordingly, it is an object of the invention to solve the above problems of the prior art and to provide a low-loss polymer waveguide which can withstand soldering or can undergo no significant change in optical characteristics even upon a change in ambient temperature and to provide a process for producing the same.

According to the first feature of the invention, a polymer waveguide comprises: a cladding layer with a low refractive index; and a core layer with a high refractive index of a substantially rectangular section covered with the cladding layer, wherein the core layer and a side cladding layer constituting the cladding layer in its portion located on both sides of the core layer are formed of a material comprising a branched polysilane compound containing a silicone compound.

According to the second feature of the invention, a polymer waveguide comprises: a cladding layer with a low refractive index; and a core layer with a high refractive index of a substantially rectangular section covered with the cladding layer, wherein the core layer and a side cladding layer constituting the cladding layer in its portion located on both sides of the core layer are formed of a material comprising a branched polysilane compound containing a trichloromethyltriazine photoacid generator.

In the polymer waveguide according to the first and second features of the invention, preferably, the side cladding layer has a refractive index which has been lowered by ultraviolet irradiation so as to provide a difference in specific refractivity of at least 1% between the side cladding layer before the ultraviolet irradiation and the side cladding layer after the ultraviolet irradiation.

In the polymer waveguide according to the first and second features of the invention, preferably, the core layer has been exposed to ultraviolet light and kept at a higher refractive index than that of the side cladding layer.

In the polymer waveguide according to the first and second features of the invention, preferably, the cladding layer and the core layer are provided on a plate member formed of a semiconductor, glass, a magnetic material, a plastic, or a composite thereof.

In the polymer waveguide according to the first and second features of the invention, preferably, the cladding layer comprises a silicone compound.

In the polymer waveguide according to the first and second features of the invention, preferably, the core layer and the side cladding layer have an ultraviolet cut layer on the top surface, the under surface, or both the top and under surfaces thereof.

In the polymer waveguide according to the first and second features of the invention, preferably, an upper cladding layer constituting the cladding layer in its portion located on the upper side of the core layer and a lower cladding layer constituting the cladding layer in its portion located on the lower side of the core layer are formed of a material containing a trichloromethyltriazine photoacid generator, a polysilicon compound, and a silicone compound and have a refractive index which has been lowered by ultraviolet irradiation.

In the polymer waveguide according to the first and second features of the invention, preferably, the branched polysilane compound is a compound wherein a silicon atom is combined to silicon atoms, as well as to a hydrocarbon group, an alkoxy group, or a hydrogen atom.

In the polymer waveguide according to the first and second features of the invention, preferably, the branched polysilane compound has a degree of branching of not less than 2% and not more than 50%.

In the polymer waveguide according to the first and second features of the invention, preferably, the silicone compound is crosslinkable or comprises an alkoxy group and the blending ratio of the silicone compound to the polysilane compound is 40 to 90% by weight.

In the polymer waveguide according to the first and second features of the invention, preferably, the photoacid generator is a trichloromethyltriazine photoacid generator and the blending ratio of the trichloromethyltriazine photoacid generator to the polysilane compound is not less than 1% by weight and not more than 5.5% by weight.

According to the third feature of the invention, a process for producing a polymer waveguide, comprises the steps of: forming a polymer layer, with a high refractive index, containing a polysilane compound and a silicone compound on the upper surface of a lower cladding layer with a low refractive index; placing a photomask, with a desired pattern drawn thereon, on the upper surface of the polymer layer and applying ultraviolet light to the polymer layer through the photomask to form a core layer with a high refractive index of a substantially rectangular section and a side cladding layer, which has been brought to a low refractive index, on the side portion of the core layer; forming an upper cladding layer with a low refractive index on the upper surface of the core layer and the side cladding layer; and forming an ultraviolet (UV) cut layer on the upper surface of the upper cladding layer.

According to the fourth feature of the invention, a process for producing a polymer waveguide, comprises the steps of: forming a polymer layer, with a high refractive index, on the upper surface of a lower cladding layer with a low refractive index; forming an upper cladding layer with a low refractive index on the polymer layer; placing a photomask on the upper cladding layer and applying ultraviolet light to form a core layer with a high refractive index of a substantially rectangular section and a side cladding layer with a low refractive index on both sides of the core layer; and then forming an ultraviolet (UV) cut layer on the upper cladding layer.

In the process according to the third and fourth features of the invention, preferably, the lower cladding layer is formed on a plate member formed of a semiconductor, glass, a magnetic material, a plastic, or a composite thereof.

In the process according to the third and fourth features of the invention, preferably, the polymer layer is formed by coating a solution of the polymer material in an organic solvent onto a plate member and heat treating the coating at a temperature of 100 to 280° C. to cure the coating.

The first to fourth features of the invention can realize a polymer waveguide with low optical propagation loss by photobleaching, which polymer waveguide has very small dependence of refractive index upon a temperature up to a high temperature of about 250° C.

This can be achieved by using a branched polysilane compound and incorporating a silicone compound with high light transmittance into the polysilane compound at a predetermined blending ratio to reduce the temperature dependence of the refractive index and, at the same time, to enhance the light transmittance of the polymer core layer. When the branched polysilane compound has a degree of branching of not less than 2%, the higher the degree of branching, the lower the optical propagation loss. Further, the addition of the silicone compound in a larger amount to the branched polysilane compound can realize lower optical propagation loss.

When ultraviolet light is applied through a photomask, a waveguide can be easily produced which has a three-dimensional refractive index difference structure having a specific refractivity difference of at least 1%. Therefore, in the polymer waveguide of the present invention, the light scattering loss attributable to unevenness of the structure can be made smaller than that in the conventional polymer waveguide.

A polymer material prepared by adding a crosslinkable or alkoxy-containing silicone compound to the branched polysilane compound is easily dissolved in an organic solvent, such as toluene. In this case, the particle diameter of the polymer material becomes very small, and, consequently, a homogeneous solution can be prepared. Therefore, a low-loss polymer layer substantially free from very small light scattering center can be formed on various substrates. When this layer having an even particle diameter is irradiated with ultraviolet light through a photomask with a desired pattern drawn thereon, the above pattern can be very faithfully transferred onto the layer. This can homogenize the interface of the core layer and the side cladding layer and thus can realize a polymer waveguide having low optical scattering loss. This homogeneity of the interface is very important for realizing a low-loss waveguide having a large specific refractivity difference.

Further, the addition of a desired amount of a trichloromethyltriazine photoacid generator to a material comprising silicone homogeneously added to the polysilane enables the refractive index to be kept constant up to a higher temperature, permits the refractive index to be changed to a desired value with high accuracy by ultraviolet irradiation, and, in addition, can improve the sensitivity of the layer to a change in refractive index upon the application of ultraviolet light.

Further, the use of a silicone compound in the cladding layer with a low refractive index can further improve the homogeneity of interface and the adhesion between this cladding layer and the core layer and between this cladding layers and the side cladding layer and, at the same time, can suppress the occurrence of microcracks attributable to a difference in coefficient of thermal expansion.

When the upper part or lower part of the polymer waveguide is covered with an ultraviolet cut layer, the long-term stability of the refractive index of the polymer layer can be improved.

Thus, a polymer waveguide can be prepared in a simple and cost-effective manner.

According to the fifth feature of the invention, a polymer waveguide comprises: a lower cladding layer with a low refractive index; a core layer provided on the lower cladding layer, said core layer being formed of a polymer film with a high refractive index which has been produced by heat treating a branched polysilane compound containing a predetermined amount of a silicone compound at a temperature of 180 to 230° C.; a side cladding layer which has been formed by applying ultraviolet light to said polymer layer in its portion located on both sides of the portion constituting the core layer to lower the refractive index of the polymer layer; and an upper cladding layer provided on the core layer and the side cladding layer, said upper cladding layer being formed of a silicone compound with a low refractive index.

In the polymer waveguide according to the fifth feature of the invention, preferably, the maximum difference in specific refractivity between the core layer and the side cladding layer is at least 3%.

In the polymer waveguide according to the fifth feature of the invention, preferably, the branched polysilane compound is a compound wherein a silicon atom is combined to silicon atoms, as well as to a hydrocarbon group, an alkoxy group, or a hydrogen atom.

In the polymer waveguide according to the fifth feature of the invention, preferably, the branched polysilane compound has a degree of branching of not less than 2% and not more than 50%.

In the polymer waveguide according to the fifth feature of the invention, preferably, the silicone compound is crosslinkable or comprises an alkoxy group and the blending ratio of the silicone compound to the polysilane compound is 40 to 90% by weight.

In the polymer waveguide according to the fifth feature of the invention, preferably, the polymer layer with a high refractive index contains a trichloromethyltriazine photoacid generator and the blending ratio of the trichloromethyltriazine photoacid generator to the polysilane compound is not less than 1% by weight and not more than 5.5% by weight.

In the polymer waveguide according to the fifth feature of the invention, preferably, the silicone compound constituting the upper cladding layer is a cured product of a heat-curable silicone compound.

The polymer waveguide according to the fifth feature of the invention preferably further comprises an ultraviolet cut layer which has been provided on the upper cladding layer after the formation of the three-dimensional refractive index structure by the exposure of ultraviolet light.

According to the sixth feature of the invention, a process for producing a polymer waveguide, comprises the steps of: providing a polymer material solution, with a high refractive index, comprising a predetermined amount of a silicone compound and a branched polysilane compound dissolved in an organic solvent soluble with the silicone compound and the branched polysilane compound; coating the polymer material solution onto a lower cladding layer with a low refractive index; heat treating the coating of the polymer material solution together with the underlying lower cladding layer at a temperature of 180 to 230° C. to form a polymer layer; coating a silicone compound with a low refractive index onto the polymer layer; heat treating the coating of the silicone compound at a temperature of 180 to 230° C. to cure the coating, thereby forming an upper cladding layer; and applying ultraviolet light to the polymer film from above the upper cladding layer through a photomask with a core pattern drawn thereon to form a core layer with a high refractive index of a substantially rectangular section and a side cladding layer with a low refractive index on both sides of the core layer.

In the process according to the sixth feature of the invention, preferably, the step of coating the material solution for a polymer layer and the step of heat treating the coating to cure the coating are carried out in an ultraviolet cut environment.

According to the fifth and sixth features of the invention, when the polymer layer is cured at a temperature around the solder reflow temperature, that is, 180 to 230° C., the Si—Si bond in the main chain of polysilane is held without being cleaved. Further, the decomposition of the side chain (for example, a phenyl group) does not occur. In addition, since the silicone compound is added to the polysilane, a polymer layer for a cladding layer, such as silicone, can be strongly bonded to and evenly formed onto the heat-treated polymer layer with good adhesion between this polymer layer for a cladding layer and the heat-treated polymer layer. In this connection, since the curing temperature of the polymer layer is around the solder reflow temperature, the polymer layer can satisfactorily withstand solder reflow for several tens of seconds and, in addition, the optical characteristics are less likely to deteriorate. Furthermore, a maximum specific refractivity difference Δ between the core layer and the side cladding layer of 3% or more can be realized. Therefore, microminiture waveguides can be realized.

Further, according to the invention, when the branched polysilane compound is a compound wherein a silicon atom is combined to silicon atoms, as well as to a hydrocarbon group, an alkoxy group, or a hydrogen atom, there is no fear of the Si—Si bond being cleaved. Further, when the degree of branching of the branched polysilane compound is not less than 2%, the light transmittance can be made higher than that in the case of the conventional linear polysilane compound. In this case, the higher the degree of branching, the better the light transmittance. The upper limit of the degree of branching is 50% from the viewpoint of the solubility of the branched polysilane in an organic solvent to prepare a polymer solution.

In the invention, the blending ratio of the silicone compound to the polysilane compound is preferably as large as 40 to 90% by weight. In this case, the polymer layer can be adhered to the silicone cladding layer with high adhesion strength.

When a trichloromethyltriazine photoacid generator is added to the polymer layer for a core, the waveguide pattern can be easily formed by ultraviolet irradiation with good sensitivity. At the same time, the stability of the refractive index against heat can be further improved, and the refractive index can be kept substantially constant up to a temperature of about 250° C.

When a heat-curable silicone compound is used in the upper cladding layer formed of the silicone compound with a low refractive index, the upper cladding layer can be evenly formed with good adhesion to the polymer layer for photobleaching because the polymer layer for photobleaching contains a silicone compound.

After the formation of a three-dimensional refractive index structure by ultraviolet irradiation, the provision of an ultraviolet cut layer on the cladding layer formed of a polymer material with a low refractive index can suppress the deterioration in refractive index of the polymer waveguide for a long period of time.

In the process according to the sixth feature of the invention, since the polymer material is dissolved in an organic solvent, the polymer layer can be easily formed on the cladding layer with a low refractive index by coating. In addition, at the stage of coating of a polymer solution for a cladding layer onto the core layer, the core layer does not substantially contain the organic solvent, and, thus, the polymer solution for a cladding layer does not substantially permeate the inside of the core.

In the process according to the sixth feature of the invention, the step of coating the polymer material solution and the step of curing the coating by heat treatment are carried out in an ultraviolet cut environment. Therefore, an unnecessary change in characteristics of the polymer layer can be avoided.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
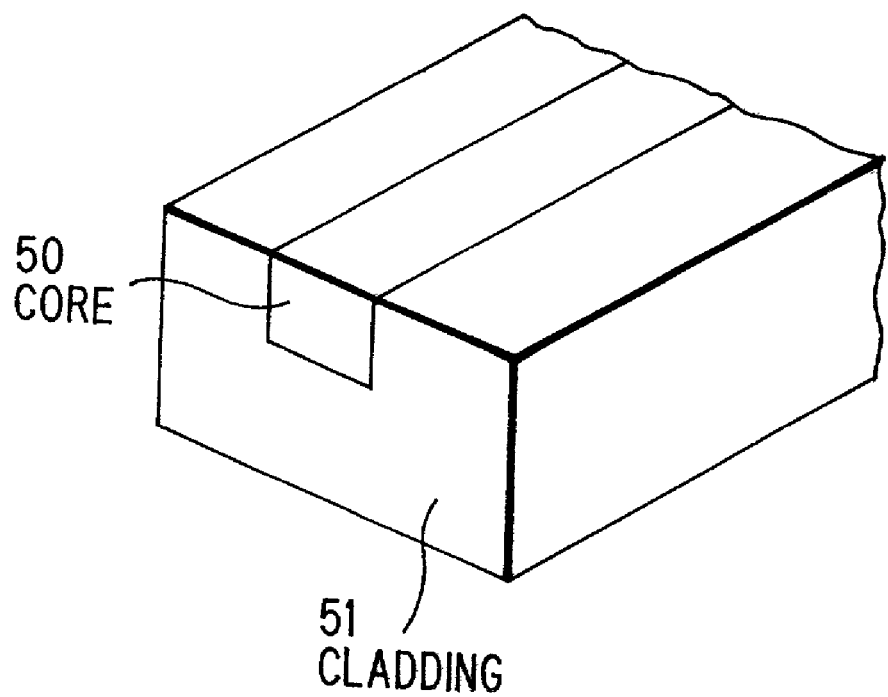
FIG. 1 is a perspective view of the appearance of a polymer waveguide using a linear polysilane material.

Materials usable in the polymer waveguide according to the invention will be explained.

Branched Polysilane

The polysilane used in the invention is of branched type rather than linear (straight-chain) type. Branched polysilanes are distinguished from linear polysilanes by the state of attachment (bond) of silicon (Si) atoms contained in the polysilanes. Branched polysilanes are polysilanes containing a silicon atom(s) such that the number of bonds of the silicon atom to adjacent silicon atoms is 3 or 4. On the other hand, linear polysilanes are polysilanes in which the number of bonds of a silicon atom to adjacent silicon atoms is 2. Since the valency of the silicon atom is generally 4, silicon atoms having a number of bonds of 3 or less, among silicon atoms present in the polysilane, is combined to silicon atoms, as well as to a hydrocarbon group, an alkoxy group, or a hydrogen atom.

Preferred hydrocarbon groups include aliphatic hydrocarbon groups having 1 to 10 carbon atoms optionally substituted by a halogen and aromatic hydrocarbon groups having 6 to 14 carbon atoms. Specific examples of aliphatic hydrocarbon groups include chain-type aliphatic hydrocarbon groups, such as methyl, propyl, butyl, hexyl, octyl, decyl, trifluoropropyl, and nonafluorohexyl groups, and alicyclic hydrocarbon groups, such as cyclohexyl and methylcyclohexyl groups. Specific examples of aromatic hydrocarbon groups include phenyl, p-tolyl, biphenyl, and anthracyl groups. Alkoxy groups may have 1 to 8 carbon atoms, and specific examples thereof include methoxy, ethoxy, phenoxy, and octyloxy groups. Among these groups, methyl and phenyl groups are particularly preferred from the viewpoint of easiness of synthesis.

In the case of branched polysilanes, preferably, not less than 2% of the total number of silicon atoms in the branched polysilane is accounted for by silicon atoms in which the number of bonds of the silicon atom to adjacent silicon atoms is 3 or 4. When this proportion is less than 2% or in the case of linear polysilanes, the crystallinity is so high that crystallites are likely to be formed in the film. The formation of crystallites is causative of scattering and thus lowers the transparency.

The polysilane used in the invention may be produced by a polycondensation reaction. In this polycondensation reaction, a halogenated silane compound is heated in the presence of an alkali metal, such as sodium, in an organic solvent, such as n-decane or toluene, at 80° C. or above. The polysilane used in the invention may also be synthesized by electrolytic polymerization or by a method using a metallic magnesium and a metal chloride.

In the case of the branched polysilane, a contemplated branched polysilane can be produced by heating a halosilane mixture comprising an organotrihalosilane compound, a tetrahalosilane compound, and a diorganodihalosilane compound to perform polycondensation. In this case, not less than 2% by mole of total amount of the halosilane mixture is accounted for by the organotrihalosilane compound and the tetrahalosilane compound.

Here the organotrihalosilane compound is a source for a silicon atom of which the number of bonds to adjacent silicon atoms is 3. On the other hand, the tetrahalosilane compound is a source for a silicon atom of which the number of bonds to adjacent silicon atoms is 4. In this connection, the network structure can be confirmed by the measurement of ultraviolet absorption spectra or nuclear magnetic resonance spectra of silicon.

The halogen atom possessed by the organotrihalosilane compound, the tetrahalosilane compound, and the diorganodihalosilane compound as the starting compounds for the polysilane is preferably a chlorine atom. Substituents other than the halogen atom possessed by the organotrihalosilane compound and the diorganodihalosilane compound include the above-described hydrocarbon groups, alkoxy groups, and a hydrogen atom.

This branched polysilane is soluble in an organic solvent and is not particularly limited so far as a transparent film can be formed by coating the branched polysilane. In this case, preferred organic solvents include hydrocarbon (with 5 to 12 carbon atoms) solvents, halogenated hydrocarbon solvents, and ether solvents.

Examples of hydrocarbon solvents include pentane, hexane, heptane, cyclohexane, n-decane, n-dodecane, benzene, toluene, xylene, and methoxybenzene. Examples of halogenated hydrocarbon solvents include carbon tetrachloride, chloroform, 1,2-dichloroethane, dichloromethane, and chlorobenzene. Examples of ether solvents include diethyl ether, dibutyl ether, and tetrahydrofuran.

When a polysilane compound having a degree of branching of not less than 2% is used as the branched polysilane compound, the light transmittance increases with increasing the degree of branching of the branched polysilane compound. Deuterated or partially or wholly halogenated, particularly fluorinated branched polysilane compounds may also be used. Therefore, absorption at a specific wavelength can be suppressed, and the light transmittance is high over a wide wavelength range. In this case, when a photoacid generator is further contained, it becomes possible to cause a change in refractive index with high sensitivity and high accuracy upon the exposure of ultraviolet light. Further, the stability of refractive index against heat can be improved. As described above, the upper limit of the degree of branching is preferably 50% from the viewpoint of the solubility of the branched polysilane in an organic solvent to prepare a polymer solution.

Silicone Compound

The silicone compound used in the invention is represented by formula

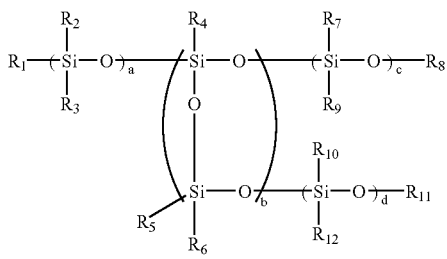

In the above formula, $R_1$ to $R_{12}$, which may be the same or different, represent a group selected from the group consisting of aliphatic hydrocarbon groups with 1 to 10 carbon atoms optionally substituted by a halogen or a glycidyloxy group, aromatic hydrocarbon groups with 6 to 12 carbon atoms, and alkoxy groups with 1 to 8 carbon atoms; and a, b, c, and d are an integer including zero (0) and satisfy $a+b+c+d \geq 1$.

Specific examples of aliphatic hydrocarbon groups in this silicone compound include chain-type aliphatic hydrocarbon groups, such as methyl, propyl, butyl, hexyl, octyl, decyl, trifluoropropyl, and glycidyloxypropyl groups, and alicyclic hydrocarbon groups, such as cyclohexyl and methylcyclohexyl groups. Specific examples of aromatic hydrocarbon groups include phenyl, p-tolyl, and biphenyl groups. Specific examples of alkoxy groups include methoxy, ethoxy, phenoxy, octyloxy, and tert-butoxy groups.

The type of $R_1$ to $R_{12}$ and the value of a, b, c, and d are not particularly important and are not particularly limited so far as the silicone compound is compatible with the polysilane and the organic solvent and the formed film is transparent. When the solubility is taken into consideration, the silicone compound preferably has the same hydrocarbon group as the polysilane used. For example, when a phenylmethyl-type polysilane is used, the use of a phenylmethyl-type or diphenyl-type silicone compound is preferred. A silicone compound, wherein at least two of $R_1$ to $R_{12}$ are an alkoxy group having 1 to 8 carbon atoms, that is, a silicone compound having two or more alkoxy groups per molecule, can be utilized as a crosslinking agent. Examples of this type of silicone compound include methylphenylmethoxysilicones having an alkoxy group content of 15 to 35% by weight and phenylmethoxysilicones having an alkoxy group content of 15 to 35% by weight.

The molecular weight of the silicone compound is preferably not more than 10000, particularly preferably not more than 3000. The silicone compound may also be a deuterated, or partially or wholly halogenated, particularly fluorinated compound. Therefore, absorption at specific wavelength can be suppressed, the light transmittance is high over a wide range of wavelengths, the refractive index can be changed upon ultraviolet irradiation with high sensitivity and high accuracy, and, in addition, the stability of the refractive index against heat can be improved.

Photoacid Generator

The photoacid generator is not particularly limited, and any compound may be used so far as the compound can generate an acid upon exposure to light. Examples of photoacid generators include unsubstituted or substituted 2,4,6-tris(trihalomethyl)-1,3,5-triazine. Examples of substituted 2,4,6-tris(trihalomethyl)-1,3,5-triazine include 2,4,6-tris(trihalomethyl)-1,3,5-triazine which has been substituted at the 2-position or at the 2- and 4-positions. Substituents in these compounds include optionally substituted aliphatic and aromatic hydrocarbon groups. Triazine having a trichloromethyl group may generally be used.

The addition of the photoacid generator enables Si—Si bond to be efficiently cleaved by an acid produced from halogen radicals and the photoacid generator.

Preferred embodiments of the first to fourth features of the invention will be explained in detail in conjunction with FIGS. 2 to 15.

Figure 2:
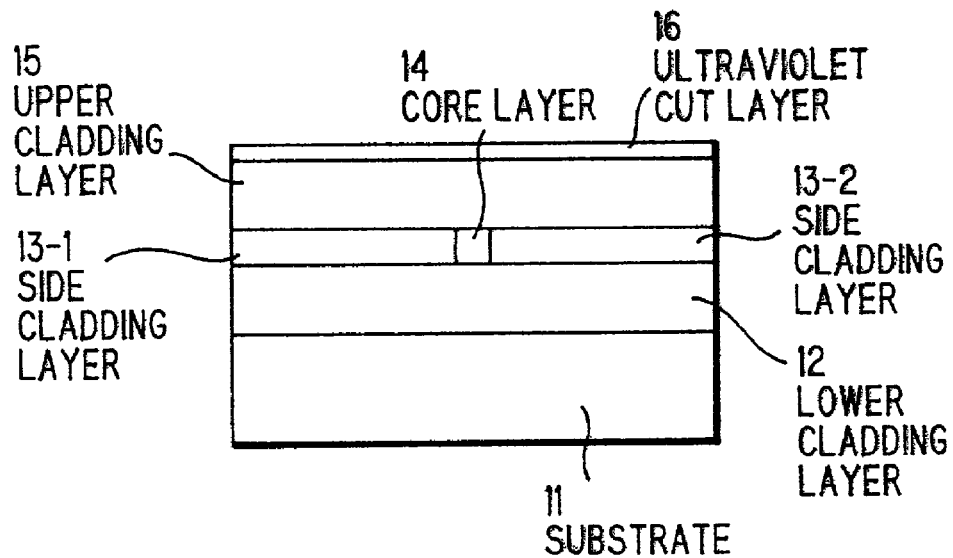
FIG. 2 is a cross-sectional view showing a preferred embodiment of the polymer waveguide according to the invention.

FIG. 2 is a cross-sectional view showing a preferred embodiment of the polymer waveguide according to the invention.

In this polymer waveguide, a photobleaching polymer layer formed of a material comprising a branched polysilane compound and a silicone compound homogeneously blended with the branched polysilane compound at a predetermined blending ratio is used as a core layer 14 and side cladding layers 13-1, 13-2.

The construction of this polymer waveguide will be first explained.

A lower cladding layer 12 with a low refractive index is provided on a substrate 11. A core layer 14 with a high refractive index formed of a photobleaching polymer layer comprising a branched polysilane compound and a silicone compound homogeneously blended with the branched polysilane compound at a predetermined blending ratio is provided on the lower cladding layer 12. Side cladding layers 13-1, 13-2, of which the refractive index has been lowered by ultraviolet irradiation, are provided on respective sides of the core layer 14.

An upper cladding layer 15 with a low refractive index and an ultraviolet cut layer 16 are provided in that order on the core layer 14 and the side cladding layers 13-1, 13-2. When a silicone compound is used in the lower cladding layer 12 and the upper cladding layer 15, the lower cladding layer 12 and the upper cladding layer 15 can be evenly formed with good adhesion to the core layer 14 and the side cladding layers 13-1, 13-2.

The production of the polymer waveguide shown in FIG. 2 will be explained in detail. The invention, however, is not limited to this embodiment.

A silicon (Si) substrate was provided as a substrate 11. A silicone solution prepared by dissolving pure silicone in toluene as an organic solvent was spin coated onto the substrate 11 at 1000 rpm for 20 sec. Thereafter, the coating was baked at 200° C. for 20 min to a thick layer (layer thickness: about 20 µm) with a refractive index of 1.489 as measured at a wavelength of 633 nm.

Next, a solution of a branched polysilane compound containing 50% by weight of a silicone compound in toluene was provided, and the solution was spin coated onto the lower cladding layer 12 at 500 rpm for 20 sec. The coating was then baked at 250° C. for 20 min to form a cured polymer layer (layer thickness: about 8 µm).

A photomask was then placed on the polymer layer for photobleaching, and ultraviolet light was applied from above the photomask to the polymer layer to form a latent image of the photomask pattern on the polymer layer. Irradiation energy of the ultraviolet light was on three levels of 9000 mJ, 18000 mJ, and 27000 mJ. In all the cases, a core layer 14 of a substantially rectangular section with a high refractive index, which had been substantially evenly changed in the direction of depth of the polymer layer, and side cladding layers 13-1, 13-2 with a low refractive index on respective sides of the core layer 14 were simultaneously formed.

Next, the same polymer solution as used in the formation of the lower cladding layer 12 was coated onto the core layer 14 and the side cladding layers 13-1, 13-2 in the same manner as used in the formation of the lower cladding layer 12, and the coating was then baked to form an upper cladding layer 15.

Finally, an about 2 µm-thick ultraviolet cut layer 16 was formed on the upper cladding layer 15 to prepare a polymer waveguide.

Figure 3:
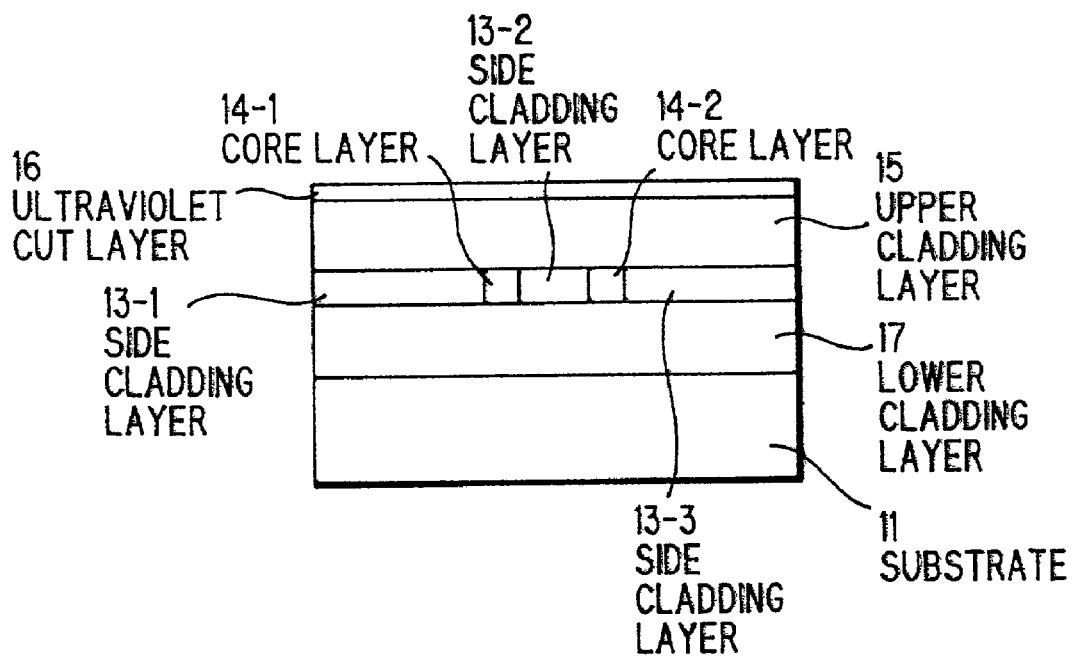
FIG. 3 is a cross-sectional view showing another preferred embodiment of the polymer waveguide according to the invention.

FIG. 3 is a cross-sectional view showing another preferred embodiment of the polymer waveguide according to the invention. In FIGS. 3 and 2, like parts are identified with the same reference numerals.

The polymer waveguide shown in FIG. 3 is different from the polymer waveguide shown in FIG. 2 in that two core layers 14-1, 14-2 are formed on the input or output side.

More specifically, this polymer waveguide comprises: a substrate 11; a lower cladding layer 17, formed of a photobleaching material, provided on the substrate 11; two core layers 14-1, 14-2 provided on the lower cladding layer 17, the core layers 14-1, 14-2 having a higher refractive index than the lower cladding layer 17 and being formed of a photobleaching material; side cladding layers 13-1, 13-2, 13-3 provided on the side of the core layers 14-1, 14-2 on the lower cladding layer 17, the side cladding layers 13-1, 13-2, 13-3 having a lower refractive index than the core layers 14-1, 14-2 and being formed of a photobleaching material; an upper cladding layer 15 provided on the core layers 14-1, 14-2 and the side cladding layers 13-1 to 13-3, the upper cladding layer 15 having a lower refractive index than the core layers 14-1, 14-2; and an ultraviolet cut layer 16 provided on the upper cladding layer 15.

This type of polymer waveguide is used in optical circuits such as directional couplers, optical switches, and optical filters. These optical circuits can be easily realized by applying ultraviolet light onto the polymer layer for photobleaching through a photomask pattern to transfer the photomask pattern onto the polymer layer.

The lower cladding layer is constituted by a layer of a branched polysilane compound containing 50% by weight of a silicone compound which has been exposed to ultraviolet light to lower the refractive index. The use of this layer can improve the homogeneity of interface and the adhesion between the lower cladding layer and the core layers 14-1, 14-2 formed on the lower cladding layer and between the lower cladding layer and the side cladding layers 13-1, 13-2, 13-3 formed on the lower cladding layer.

Figure 4:
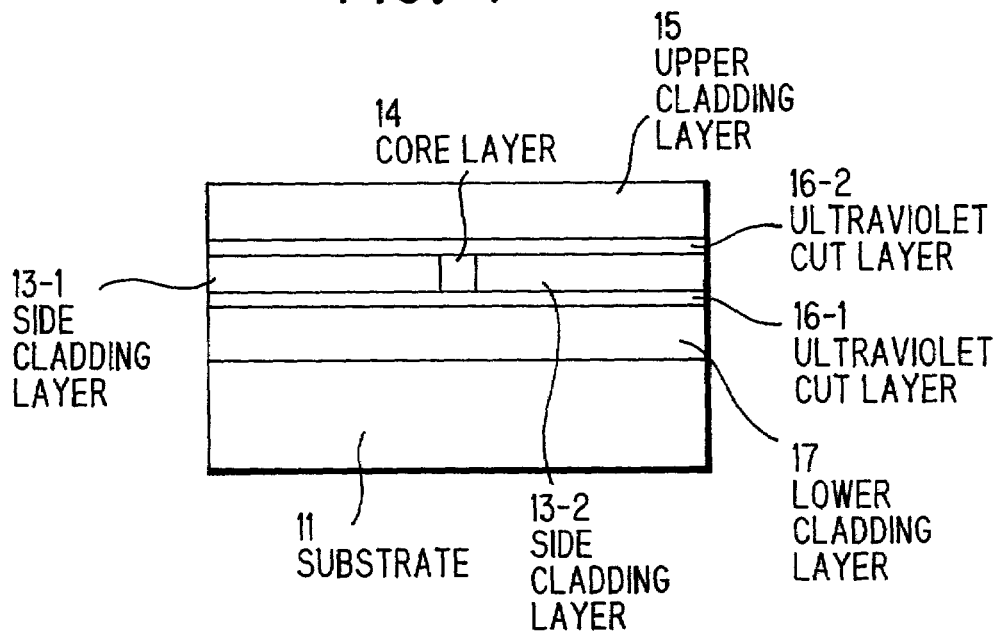
FIG. 4 is a cross-sectional view showing a further preferred embodiment of the polymer waveguide according to the invention.

FIG. 4 is a cross-sectional view showing a further preferred embodiment of the polymer waveguide according to the invention.

The polymer waveguide shown in FIG. 4 is different from the polymer waveguide shown in FIG. 2 in that a sandwich structure is adopted wherein the core layer 14 and the side cladding layers 13-1, 13-2 are sandwiched between an ultraviolet cut layer 16-1 and an ultraviolet cut layer 16-2.

Specifically, this polymer waveguide comprises: a substrate 11; a lower cladding layer 17, formed of a photobleaching material, provided on the substrate 11; an ultraviolet cut layer 16-1 provided on the lower cladding layer 17; a core layer 14 provided on the ultraviolet cut layer 16-1, the core layer 14 having a higher refractive index than the lower cladding layer 17 and being formed of a photobleaching material; side cladding layers 13-1, 13-2, provided on the side of the core layer 14 on the ultraviolet cut layer 16-1, the side cladding layers 13-1, 13-2 having a lower refractive index than the core layer 14 and being formed of a photobleaching material; an ultraviolet cut layer 16-2 provided on the core layer 14 and the side cladding layers 13-1, 13-2; and an upper cladding layer 15 provided on the ultraviolet cut layer 16-2, the upper cladding layer 15 having a lower refractive index than the core layer 14.

The above construction of the polymer waveguide can prevent a deterioration in the refractive index of the core layer 14 and the side cladding layers 13-1, 13-2 for a long period of time.

Figure 5:
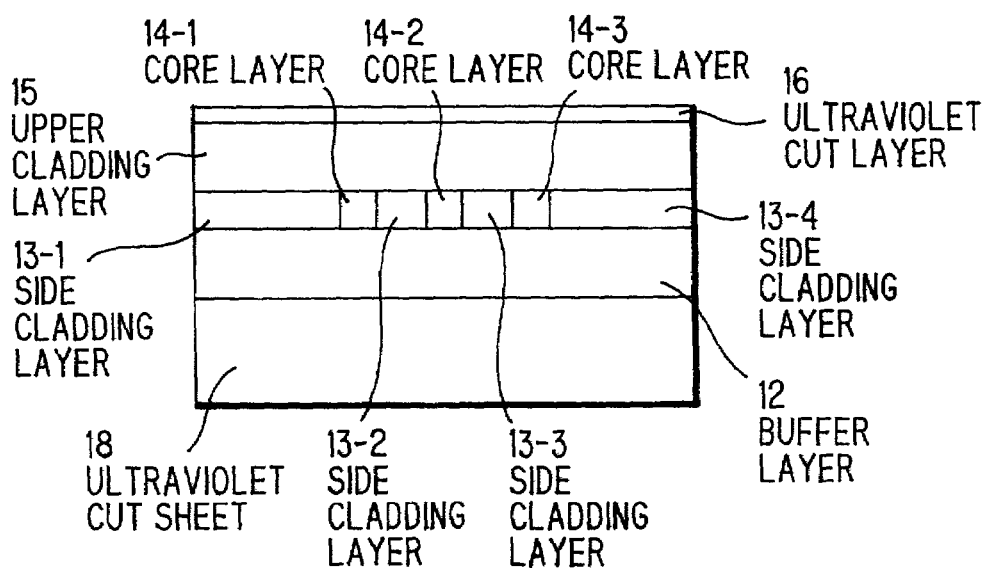
FIG. 5 is a cross-sectional view showing a still further embodiment of the polymer waveguide according to the invention.

FIG. 5 is a cross-sectional view showing a further preferred embodiment of the polymer waveguide according to the invention.

The polymer waveguide shown in FIG. 5 is different from the polymer waveguide shown in FIG. 3 in that an ultraviolet cut sheet 18 is used as the substrate and a waveguide is provided on the ultraviolet cut sheet 18.

Specifically, this polymer waveguide comprises: an ultraviolet cut sheet 18; a buffer layer 12 provided on the ultraviolet cut sheet 18; three core layers 14-1, 14-2, 14-3 provided on the buffer layer 12, the core layers 14-1, 14-2, 14-3 having a higher refractive index than the buffer layer 12 and being formed of a photobleaching material; side cladding layers 13-1 to 13-4 provided on the side of the core layers 14-1 to 14-3 on the buffer layer 12, the side cladding layers 13-1 to 13-4 having a lower refractive index than the core layers 14-1 to 14-3 and being formed of a photobleaching material; an upper cladding layer 15 provided on the core layers 14-1 to 14-3 and the side cladding layers 13-1 to 13-4, the upper cladding layer 15 having a lower refractive index than the core layers 14-1 to 14-3; and an ultraviolet cut layer 16 provided on the upper cladding layer 15.

This polymer waveguide also has the same effect as attained in the polymer waveguide shown in FIG. 3.

Figure 6:
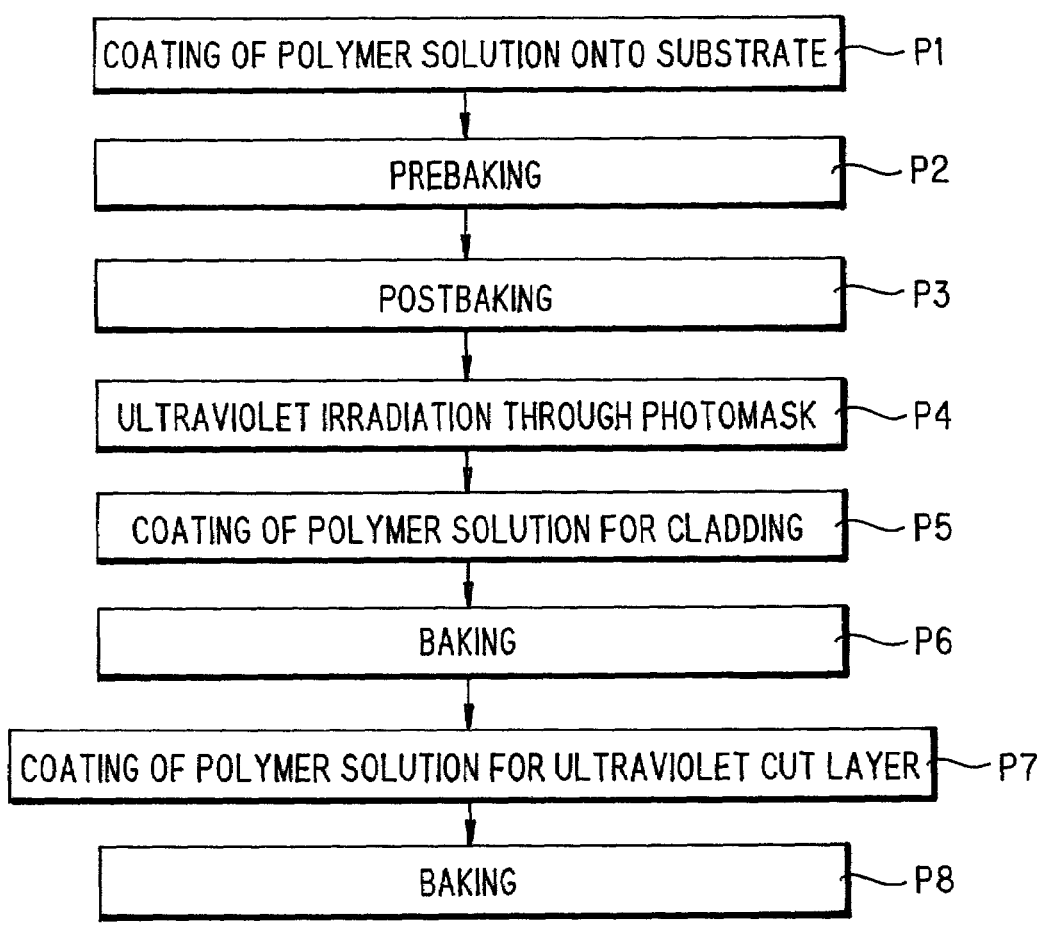
FIG. 6 is a process diagram showing a preferred embodiment of the production process of a polymer waveguide according to the invention.

FIG. 6 is a process diagram showing a preferred embodiment of the production process of a polymer waveguide according to the invention.

This production process of a polymer waveguide is carried out in an environment not exposed to ultraviolet light, such as a yellow room.

A solution of a polymer in an organic solvent is first coated onto a substrate, for example, by spin coating or extrusion coating to form a polymer coating (step P1).

The polymer coating is prebaked at 120° C. for 20 min (step P2).

The polymer coating is then post-baked in the temperature range of 180 to 250° C. for 10 min to one hr to form a polymer layer for photobleaching (step P3).

A photomask is placed on the polymer layer for photobleaching, and ultraviolet light is applied to the polymer layer through the photomask to transfer the photomask pattern onto the polymer layer (step P4).

A polymer solution for an upper cladding layer is coated onto the polymer layer (step P5).

The polymer coating for an upper cladding layer is then baked (step P6).

An ultraviolet cut layer is formed by coating on the upper cladding layer (step P7).

The layer is then baked (step P8).

Alternatively, a method may be adopted which comprises the steps of: forming a polymer layer for photobleaching for the core layer and the side cladding layer; baking the polymer layer; coating a polymer solution for the upper cladding layer onto the polymer layer; baking the coating; placing a photomask on the upper cladding layer; and then applying ultraviolet light from above the upper cladding layer to change the refractive index of the polymer layer for photobleaching.

Figure 7:
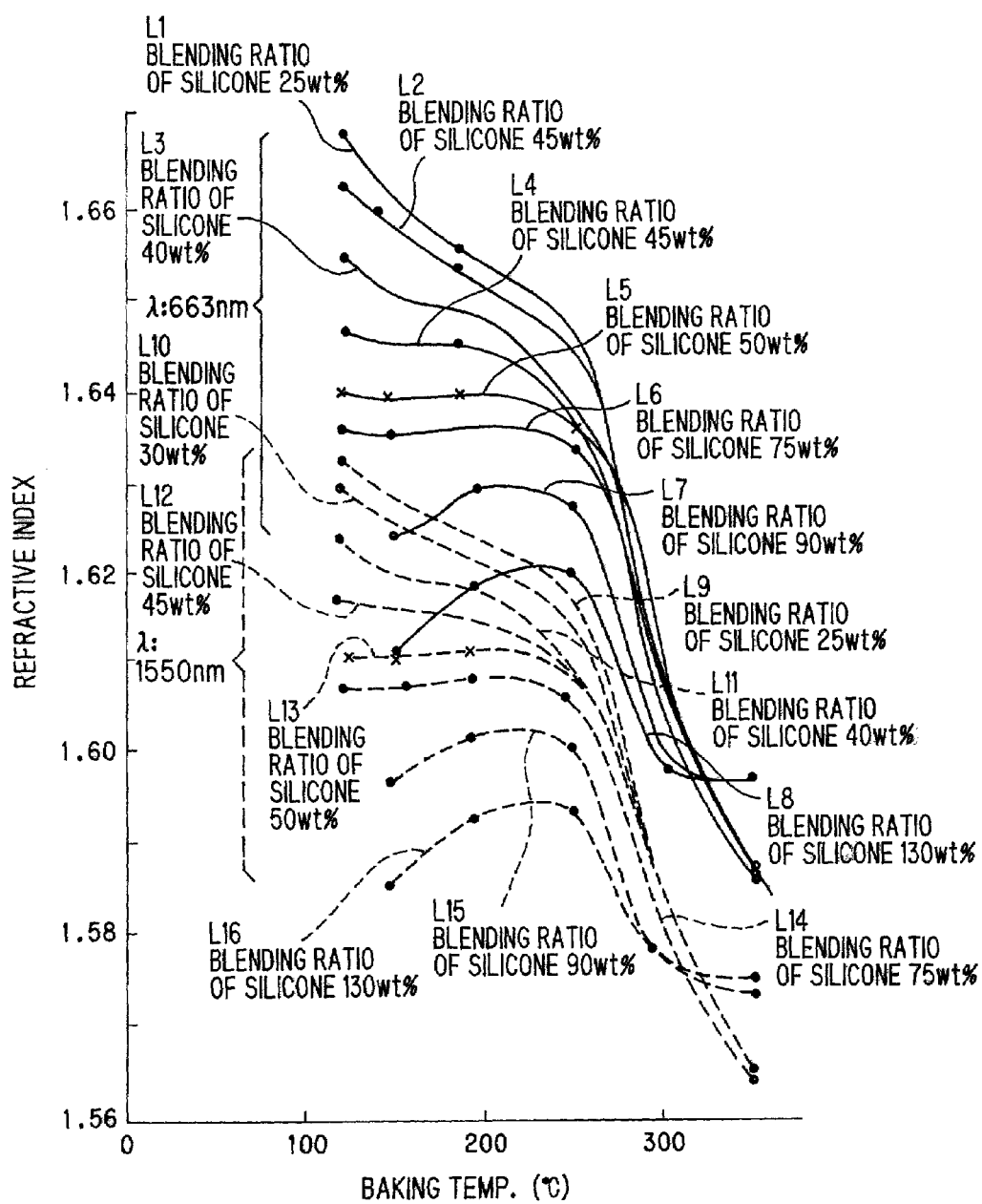
FIG. 7 is a diagram showing the characteristics of A polymer materials used in the polymer waveguide according to the invention.

FIG. 7 is a diagram showing the characteristics of polymer materials used in the polymer waveguide according to the invention. In FIG. 7, the baking temperature is plotted as abscissa against the refractive index as ordinate.

FIG. 7 shows the results of the following experiment on films prepared in the process shown in FIG. 6. Specifically, a solution of a branched polysilane compound containing a silicone compound was coated on a silicon substrate, and the coating was prebaked at 120° C. for 20 min, followed by post baking at varied temperatures. The baked films were measured for refractive index at room temperature. The refractive index was measured at a wavelength of 633 nm and at a wavelength of 1550 nm.

In FIG. 7, a solid line L1 represents a characteristic curve as measured at a wavelength of 633 nm for a material having a silicone blending ratio of 25% by weight, a solid line L2 a characteristic curve as measured at a wavelength of 633 nm for a material having a silicone blending ratio of 30% by weight, a solid line L3 a characteristic curve as measured at a wavelength of 633 nm for a material having a silicone blending ratio of 40% by weight, a solid line L4 a characteristic curve as measured at a wavelength of 633 nm for a material having a silicone blending ratio of 45% by weight, a solid line L5 a characteristic curve as measured at a wavelength of 633 nm for a material having a silicone blending ratio of 50% by weight, a solid line L6 a characteristic curve as measured at a wavelength of 633 nm for a material having a silicone blending ratio of 75% by weight, a solid line L7 a characteristic curve as measured at a wavelength of 633 nm for a material having a silicone blending ratio of 90% by weight, and a solid line L8 a characteristic curve as measured at a wavelength of 633 nm for a material having a silicone blending ratio of 130% by weight.

A broken line L9 represents a characteristic curve as measured at a wavelength of 1550 nm for a material having a silicone blending ratio of 25% by weight, a broken line L10 a characteristic curve as measured at a wavelength of 1550 nm for a material having a silicone blending ratio of 30% by weight, a broken line L11 a characteristic curve as measured at a wavelength of 1550 nm for a material having a silicone blending ratio of 40% by weight, a broken line L12 a characteristic curve as measured at a wavelength of 1550 nm for a material having a silicone blending ratio of 45% by weight, a broken line L13 a characteristic curve as measured at a wavelength of 1550 nm for a material having a silicone blending ratio of 50% by weight, a broken line L14 a characteristic curve as measured at a wavelength of 1550 nm for a material having a silicone blending ratio of 75% by weight, a broken line L15 a characteristic curve as measured at a wavelength of 1550 nm for a material having a silicone blending ratio of 90% by weight, and a broken line L16 a characteristic curve as measured at a wavelength of 1550 nm for a material having a silicone blending ratio of 130% by weight.

In this experiment, polymethylphenylsilane was used as the branched polysilane compound. A methoxy-containing crosslinkable methylphenylsilicone was used as the silicone compound. Films were formed at varied branched polysilane compound to silicone compound blending ratio.

As can be seen from FIG. 7, the blending ratio of the silicone compound is preferably in the range of 40 to 90% by weight from the viewpoint of stability of the refractive index against heat. The results show that polymer films, which cause no significant change in refractive index up to a high baking temperature around 250° C., can be formed. By virtue of this, an electronic component or an optical component can be soldered to the upper part, the interior, or the lower part of the waveguide, and a problem of a change in refractive index of the waveguide in the solder reflow process can be overcome.

Figure 8:
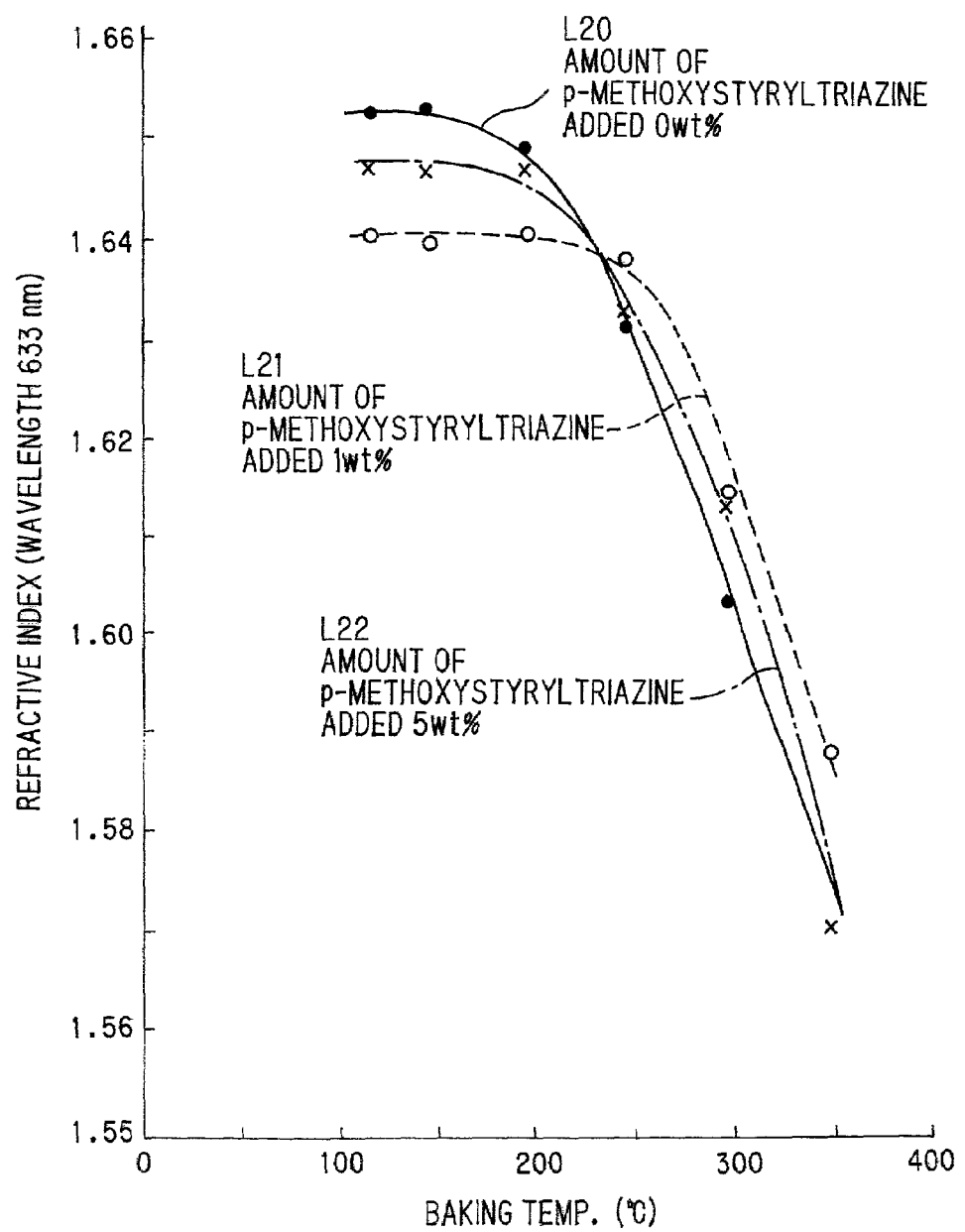
FIG. 8 is a characteristic curve showing the relationship between the baking temperature of polymer materials comprising a trichloromethyltriazine material as a photoacid generator added to a silicone compound-containing branched polysilane compound and the refractive index of the polymer materials at a wavelength of 633 nm.
Figure 9:
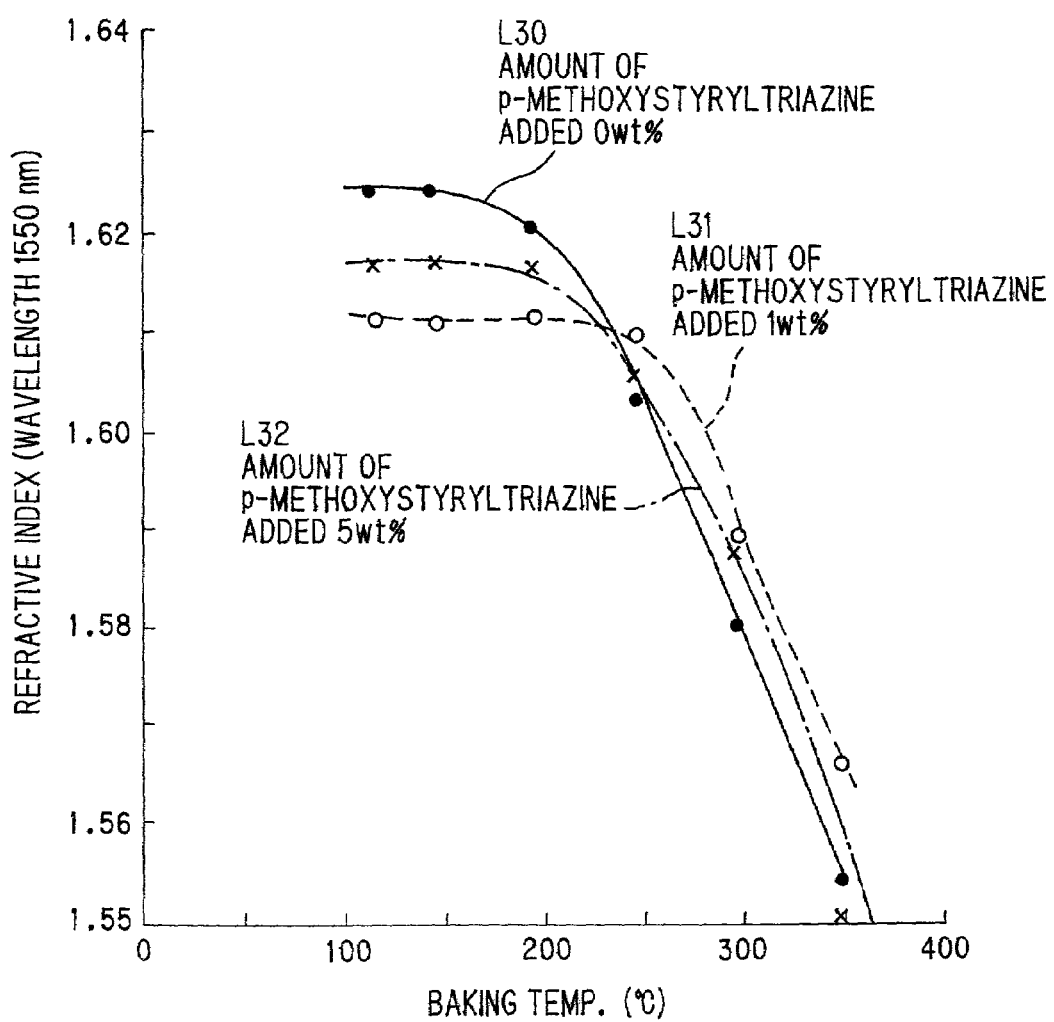
FIG. 9 is a characteristic curve showing the relationship between the baking temperature of polymer materials comprising a trichloromethyltriazine material as a photoacid generator added to a silicone compound-containing branched polysilane compound and the refractive index of the polymer materials at a wavelength of 1550 nm.

FIGS. 8 and 9 are diagrams showing the relationship between the baking temperature of polymer materials comprising a trichloromethyltriazine material as a photoacid generator added to a silicone compound-containing branched polysilane compound and the refractive index of the polymer materials. The baking temperature is plotted as abscissa against the refractive index as ordinate. FIG. 8 shows characteristics as measured at a wavelength of 633 nm, and FIG. 9 characteristics as measured at a wavelength of 1550 nm.

In FIGS. 8 and 9, p-methoxystyryltrichloromethyltriazine was used as the trichloromethyltriazine photoacid generator.

In FIG. 8, L20 represents a characteristic curve for a p-methoxystyryltrichloromethyltriazine content of 0% by weight, L21 a characteristic curve for a p-methoxystyryltrichloromethyltriazine content of 1% by weight, and L22 a characteristic curve for a p-methoxystyryltrichloromethyltriazine content of 5% by weight.

In FIG. 9, L30 is a characteristic curve for a p-methoxystyryltrichloromethyltriazine content of 0% by weight, L31 a characteristic curve for a p-methoxystyryltrichloromethyltriazine content of 1% by weight, and L32 a characteristic curve for a p-methoxystyryltrichloromethyltriazine content of 5% by weight.

As is apparent from FIGS. 8 and 9, the stability of refractive index against heat improves with increasing the trichloromethyltriazine compound content. When the trichloromethyltriazine compound content is not less than 5% by weight, however, the light transmittance in a long wavelength region (>830 nm) is lowered. For this reason, the trichloromethyltriazine compound content is preferably not less than 1% and not more than 5.5% by weight.

Figure 10:
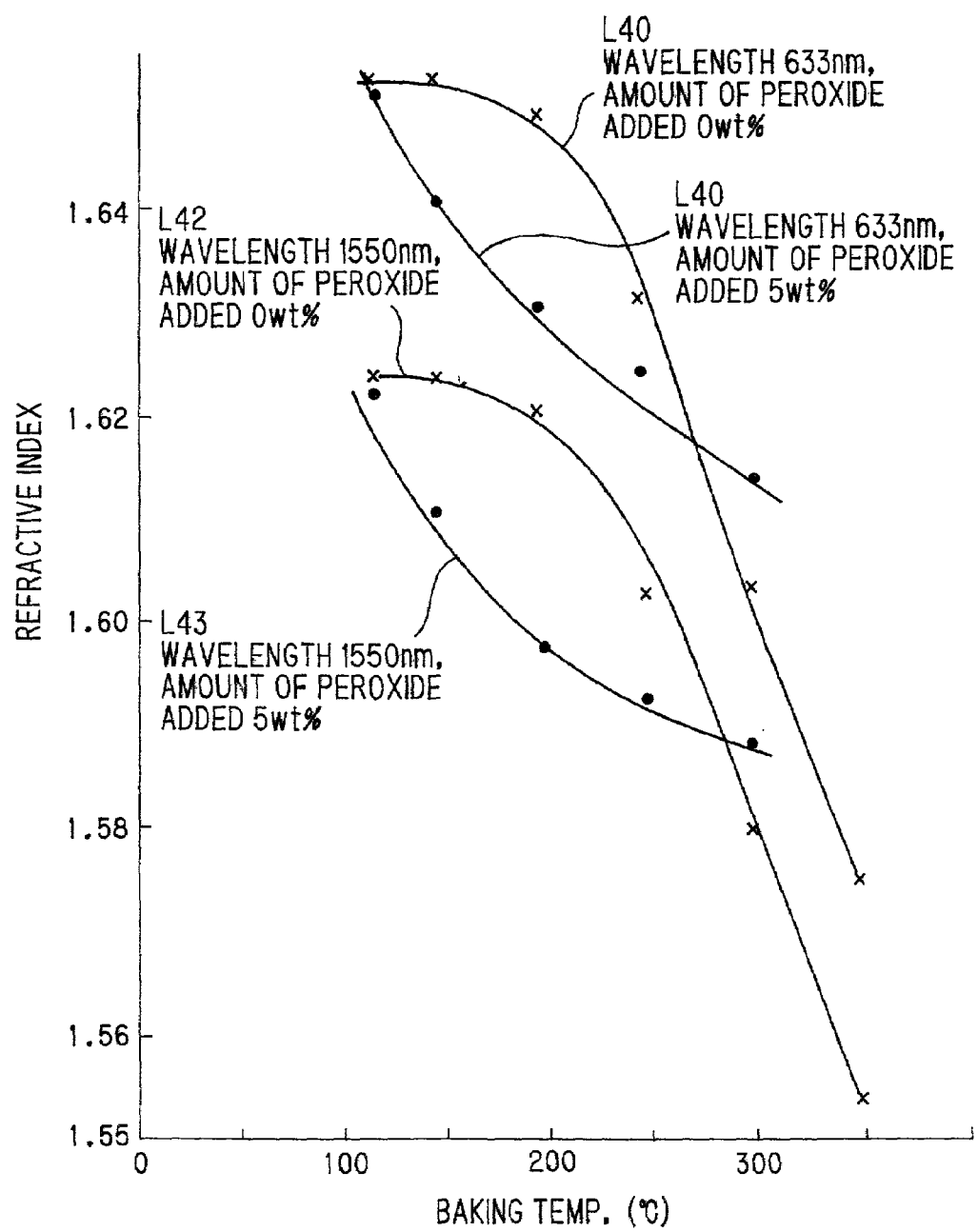
FIG. 10 is a diagram showing a change in refractive index of polymer materials using a compound, which is unfavorable as a sensitizer, as a function of the baking temperature of the polymer materials.

FIG. 10 is a diagram showing a change in refractive index of polymer materials using a compound, which is unfavorable as a sensitizer, as a function of the baking temperature. The baking temperature is plotted as abscissa against the refractive index as ordinate.

In FIG. 10, L40 represents a characteristic curve as measured at a wavelength of 633 nm for a peroxide content of 0% by weight, L41 a characteristic curve as measured at a wavelength of 633 nm for a peroxide content of 5% by weight, L42 a characteristic curve as measured at a wavelength of 1550 nm for a peroxide content of 0% by weight, and L43 a characteristic curve as measured at a wavelength of 1550 nm for a peroxide content of 5% by weight.

In this case, a photosensitive peroxide is used as the sensitizer. For a peroxide content of 0% by weight and a peroxide content of 5% by weight, the refractive index was measured. As a result, it was found that the addition of a peroxide deteriorates the stability of the refractive index against heat. In other words, some sensitizers are favorable in the invention, while some different sensitizers are unfavorable in the invention. Good results could be obtained for the trichloromethyltriazine photoacid generator. When light transmittance in a long wavelength region is taken into consideration, materials having the highest possible light transmittance are preferred. Further, materials having a maximum absorption wavelength close to the ultraviolet absorption peak wavelength of the polysilane compound should be selected. The selection of materials having a high melting point is also important.

Figure 11:
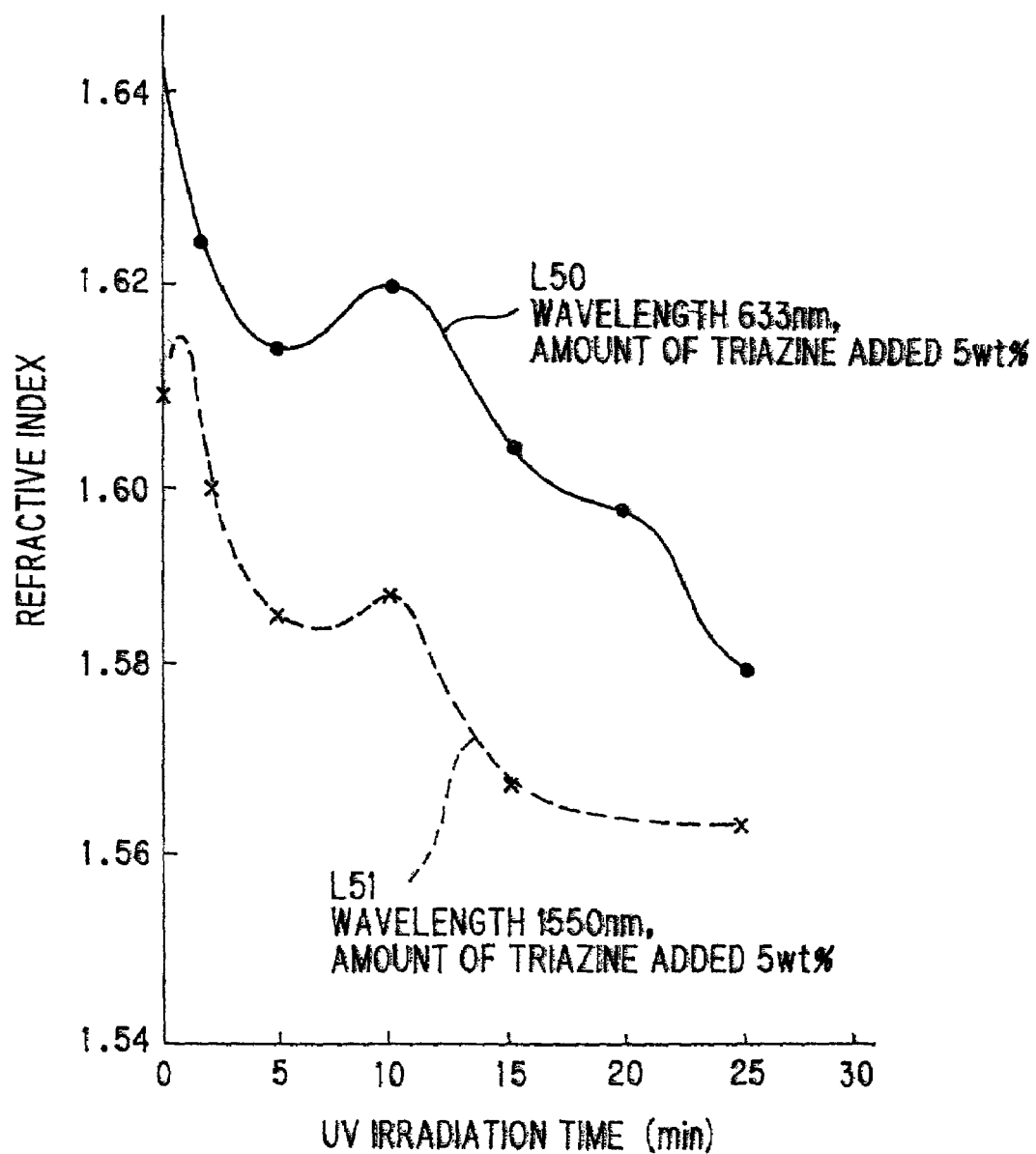
FIG. 11 is a characteristic curve showing a lowering in refractive index of a polymer material having a trichloromethyltriazine content of 0% by weight shown in FIG. 8 at a wavelength of 633 nm and at a wavelength of 1550 nm upon ultraviolet irradiation.
Figure 12:
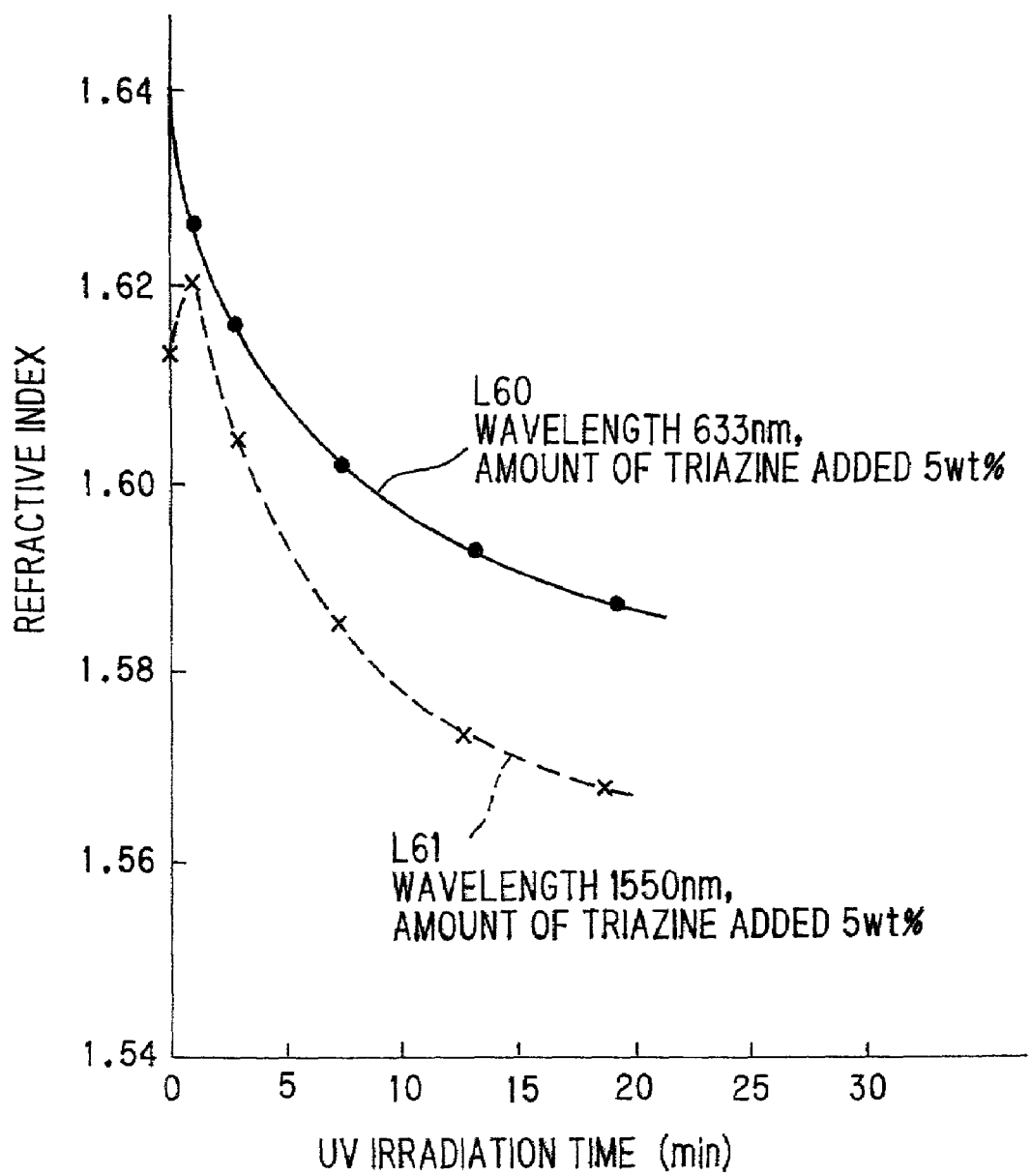
FIG. 12 is a characteristic curve showing a lowering in refractive index of a polymer material having a trichloromethyltriazine content of 5% by weight shown in FIG. 9 at a wavelength of 633 nm and at a wavelength of 1550 nm upon ultraviolet irradiation.

Characteristics of polymer films using materials comprising trichloromethyltriazine added in varied amounts to a silicone compound-containing branched polysilane compound according to the invention are shown in FIGS. 11 and 12. FIG. 11 is a diagram showing a lowering in refractive index of a polymer material having a trichloromethyltriazine content of 0% by weight shown in FIG. 8 at a wavelength of 633 nm and at a wavelength of 1550 nm upon ultraviolet irradiation, and FIG. 12 a diagram showing a lowering in refractive index of a polymer material having a trichloromethyltriazine content of 5% by weight shown in FIG. 8 at a wavelength of 633 nm and at a wavelength of 1550 nm upon ultraviolet irradiation. In FIGS. 11 and 12, UV irradiation time is plotted as abscissa against the refractive index as ordinate. In FIG. 11, L50 represents a characteristic curve as measured at a wavelength of 633 nm for a trichloromethyltriazine content of 0% by weight, and L51 a characteristic curve as measured at a wavelength of 1550 nm for a trichloromethyltriazine content of 0% by weight. In FIG. 12, L60 represents a characteristic curve as measured at a wavelength of 633 nm for a trichloromethyltriazine content of 5% by weight, and L61 a characteristic curve as measured at a wavelength of 1550 nm for a trichloromethyltriazine content of 5% by weight.

For obtaining the results shown in FIGS. 11 and 12, an experiment was carried out wherein the ultraviolet light was applied from a 150 W mercury/xenon lamp through a fiber bundle scope to the surface of the film, and the refractive index of the film was measured as a function of the ultraviolet irradiation time. The output of the fiber bundle scope was 1200 mJ/cm$^2$. As can be seen from FIGS. 11 and 12, when the content of the trichloromethyltriazine is 0% by weight, the refractive index is discontinuously varied in relation to the ultraviolet irradiation time. This means that it is difficult to accurately regulate the refractive index by varying the irradiation time. By contrast, for the film with a trichloromethyltriazine content of 5% by weight, the refractive index can be continuously varied in relation to the ultraviolet irradiation time, indicating that the refractive index can be easily regulated by varying the irradiation time.

Figure 13:
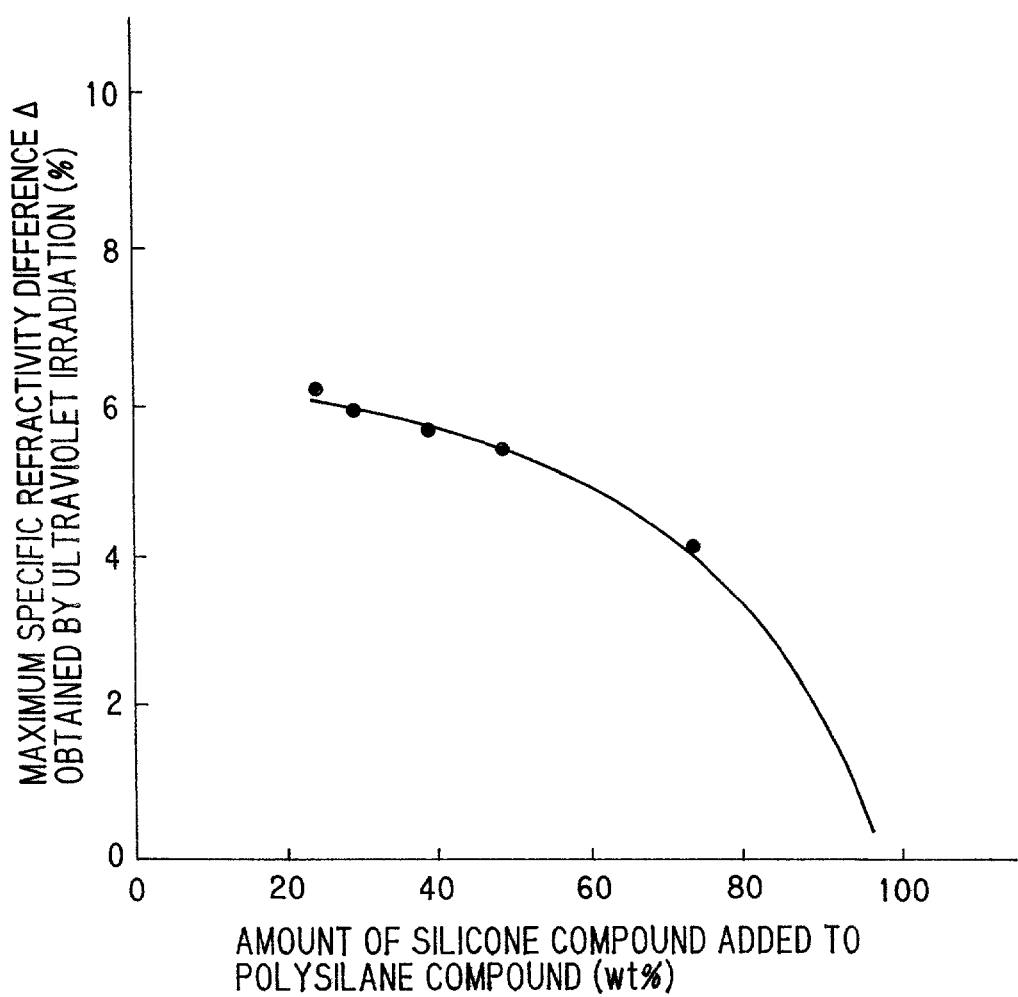
FIG. 13 is a characteristic curve showing the relationship between the content of a silicone compound in polymer films, prepared using materials comprising a silicone compound added to a branched polysilane compound, and the maximum difference in specific refractivity of the polymer films between before ultraviolet irradiation and after ultraviolet irradiation.

FIG. 13 is a diagram showing the relationship between the content of a silicone compound in polymer films, prepared using materials comprising a silicone compound added to a branched polysilane compound, and the maximum difference in specific refractivity of the polymer films between before ultraviolet irradiation and after ultraviolet irradiation. In FIG. 13, the amount of the silicone compound added to the polysilane compound is plotted as abscissa against the maximum specific refractivity difference Δ obtained by ultraviolet irradiation as ordinate.

More specifically, FIG. 13 shows the results of an experiment wherein, for polymer films baked at 200° C., among the polymer films having characteristics shown in FIG. 7, the refractive index is measured at a wavelength of 633 nm before and after ultraviolet irradiation and the maximum specific refractivity difference Δ is determined based on measurement results. As can be seen from FIG. 13, the specific refractivity difference Δ decreases with increasing the amount of the silicone compound added. The specific refractivity difference Δ is preferably as large as possible. However, the stability of refractive index against heat should be taken into consideration. In the silicone compound content range 40 to 90% by weight which is the optimal silicone compound range when the stability of refractive index against heat is taken into consideration, the specific refractivity difference Δ is not less than 3% and not more than 5.5%, indicating that the materials have satisfactorily high sensitivity.

Next, optimal polysilane compounds will be explained.

Figure 14:
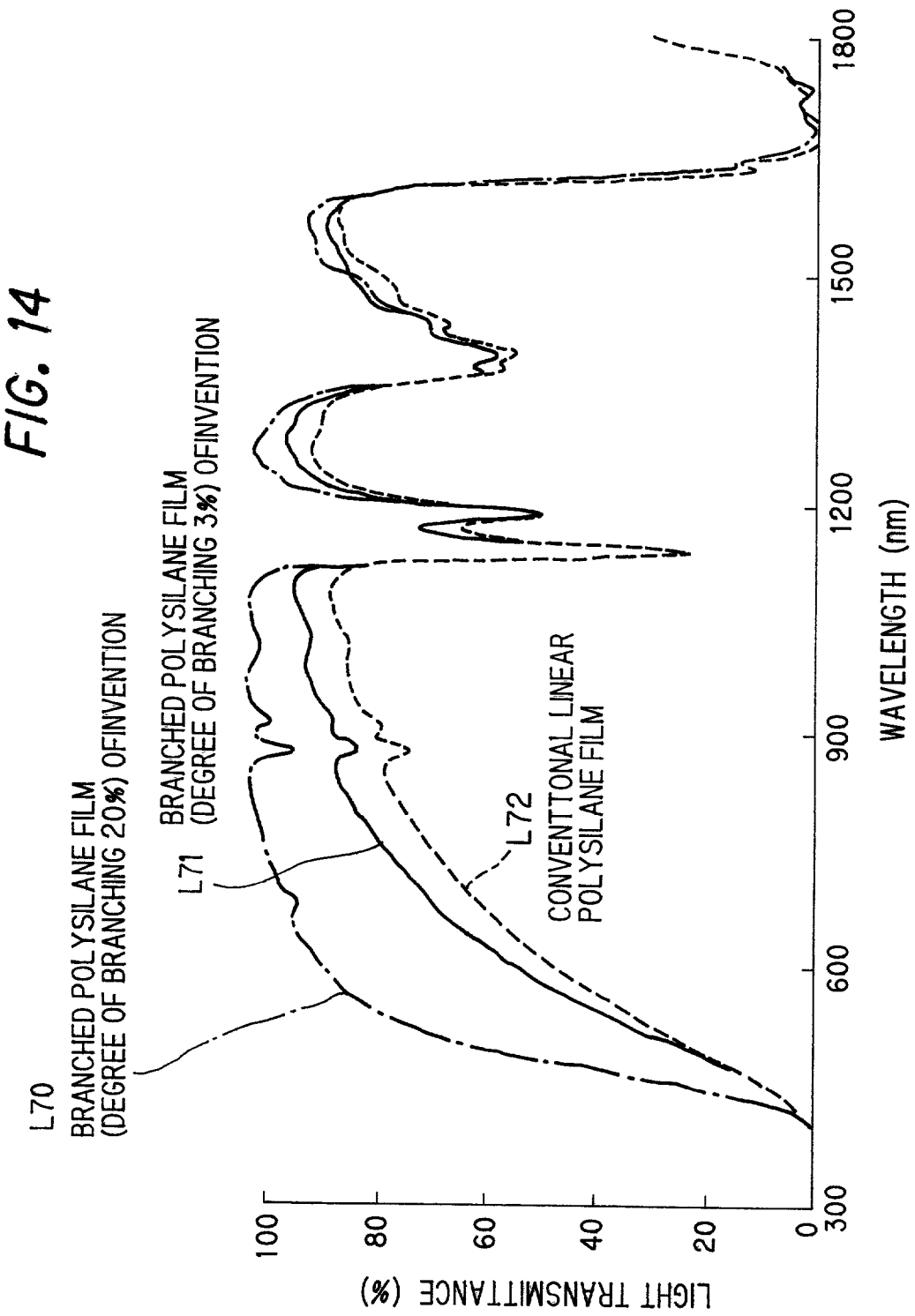
FIG. 14 is a characteristic curve showing the relationship between the light transmittance and the wavelength for a polysilane film used in the polymer waveguide according to the invention and a polysilane film used in the conventional polymer waveguide.

FIG. 14 is a diagram showing the relationship between the light transmittance and the wavelength for a polysilane film used in the polymer waveguide according to the invention and a polysilane film used in the conventional polymer waveguide. The wavelength is plotted as abscissa against the light transmittance as ordinate.

In FIG. 14, L70 represents a characteristic curve for a branched polysilane (degree of branching 20%) film as a film for the polymer waveguide according to the invention, L71 a characteristic curve for a branched polysilane (degree of branching 3%) film as a film for the polymer waveguide according to the invention, and L72 a characteristic curve for a linear polysilane film as a film for the conventional polymer waveguide. These films had a thickness of about 30 µm.

Here for comparison under the same conditions, 50% by weight of a silicone compound is added to all the polysilane films. As can be seen from FIG. 14, the branched polysilane films for use in the polymer waveguide according to the invention had higher light transmittance than the linear polysilane film for use in the conventional polymer waveguide. The present inventor has found for the first time that, in the branched polysilane films according to the invention, the light transmittance increases with increasing the degree of branching of the polysilane.

Figure 15:
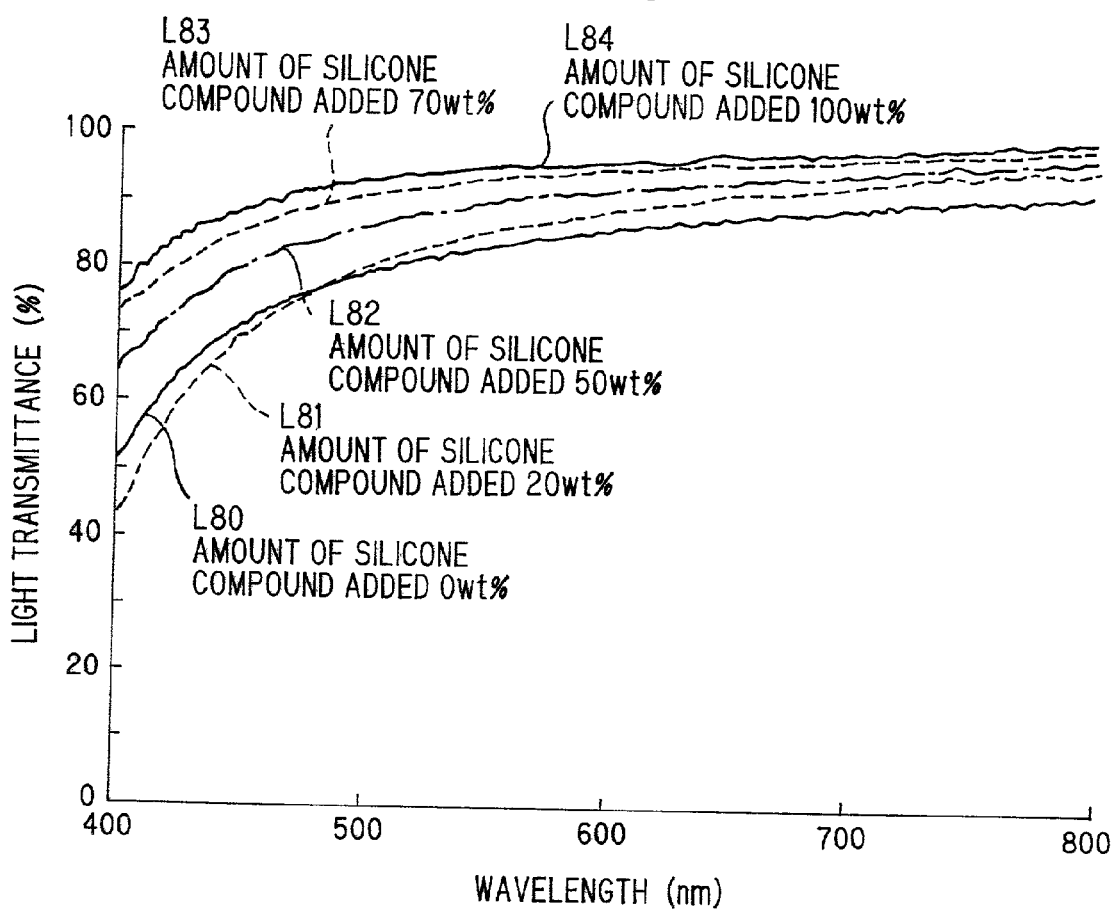
FIG. 15 is a characteristic curve showing the relationship between the amount of a silicone compound added to the branched polysilane compound used in the polymer waveguide according to the invention and the light transmittance.

FIG. 15 is a diagram showing the relationship between the amount of a silicone compound added to the branched polysilane compound used in the polymer waveguide according to the invention and the light transmittance (film thickness: about 300 µm). In FIG. 15, the wavelength is plotted as abscissa against the light transmittance as ordinate.

In FIG. 15, L80 represents a characteristic curve for a silicone compound content of 0% by weight, L81 a characteristic curve for a silicone compound content of 20% by weight, L82 a characteristic curve for a silicone compound content of 50% by weight, L83 a characteristic curve for a silicone compound content of 70% by weight, and L84 a characteristic curve for a silicone compound content of 100% by weight.

As can be seen from FIG. 15, the light transmittance increases with increasing the silicone compound content. Further, the above-described optimal silicone compound content range could be determined based on the results shown in FIGS. 15 and 7.

Preferred embodiments of the fifth and sixth features of the invention will be explained in conjunction with FIGS. 16 to 20.

Figure 16:
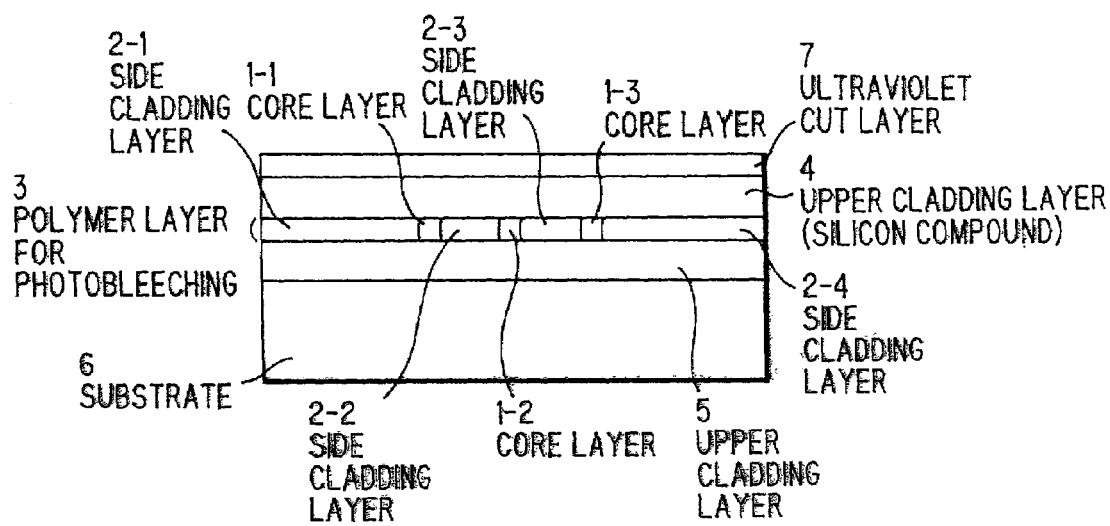
FIG. 16 is a cross-sectional view showing another preferred embodiment of the polymer waveguide according to the invention.

FIG. 16 is a cross-sectional view showing a preferred embodiment of the polymer waveguide according to the fifth feature of the invention.

The first characteristic feature of this polymer waveguide is as follows. A polymer layer 3 for photobleaching, which is to be brought to core layers 1-1 to 1-3 and side cladding layers 2-1 to 2-4, is heat treated at a temperature of 180 to 230° C. (curing temperature) to cure the polymer. A silicone compound 4 is coated on the cured polymer layer 3 for photobleaching and is then heat treated at the curing temperature to cure the silicone compound 4. Thereafter, ultraviolet light is applied through a photomask (not shown) to change the polymer layer 3 for photobleaching in its portions located on both sides of each of core layers 1-1 to 1-3 with a high refractive index of a substantially rectangular section to side cladding layers 2-1 to 2-4 with a low refractive index.

Here in addition to a reduction in absorption loss of the polymer material per se, the homogeneity of interface and the adhesion between the core layers 1-1 to 1-3 and the side cladding layers 2-1 to 2-4, between the core layers 1-1 to 1-3 and the lower cladding layer 5, and between the core layers 1-1 to 1-3 and the upper cladding layer 4 are important for reducing light scattering loss of the polymer waveguide. Numeral 6 designates a substrate, and numeral 7 an ultraviolet cut layer.

According to the invention, high homogeneity of the interface and high adhesion between the core layer and each of the cladding layers can be realized by curing the polymer layer for photobleaching at the curing temperature, coating a silicone compound onto the cured polymer layer, heat treating the silicone compound at the curing temperature to cure the silicone compound, and then applying ultraviolet light to change the polymer layer for photobleaching in its portions located on both sides of each of core layers with a high refractive index of a substantially rectangular section to side cladding layers with a low refractive index. Therefore, a waveguide having very low light scattering loss can be provided.

The second characteristic feature of the polymer waveguide according to the invention is that high homogeneity of the interface and high adhesion between the core layer and each of the cladding layers can be provided by using, in the core layer and the side cladding layer, a branched polysilane compound containing 40 to 90% by weight of a crosslinkable or alkyl-containing silicone compound in the lower cladding layer and the upper cladding layer, a heat-curable silicone compound.

The reason why the curing temperature is limited to 180 to 230° C. is that the Si—Si bond in the main chain of the branched polysilane can be maintained without being cleaved, the decomposition of phenyl group as the side chain does not occur, and a silicone cladding layer can be evenly formed on the polymer layer formed of silicone compound-containing polysilane with high adhesion between the polymer layer and the silicone cladding layer.

Another reason is that the curing temperature should be close to or above Sn/Pb solder reflow temperature.

Figure 17:
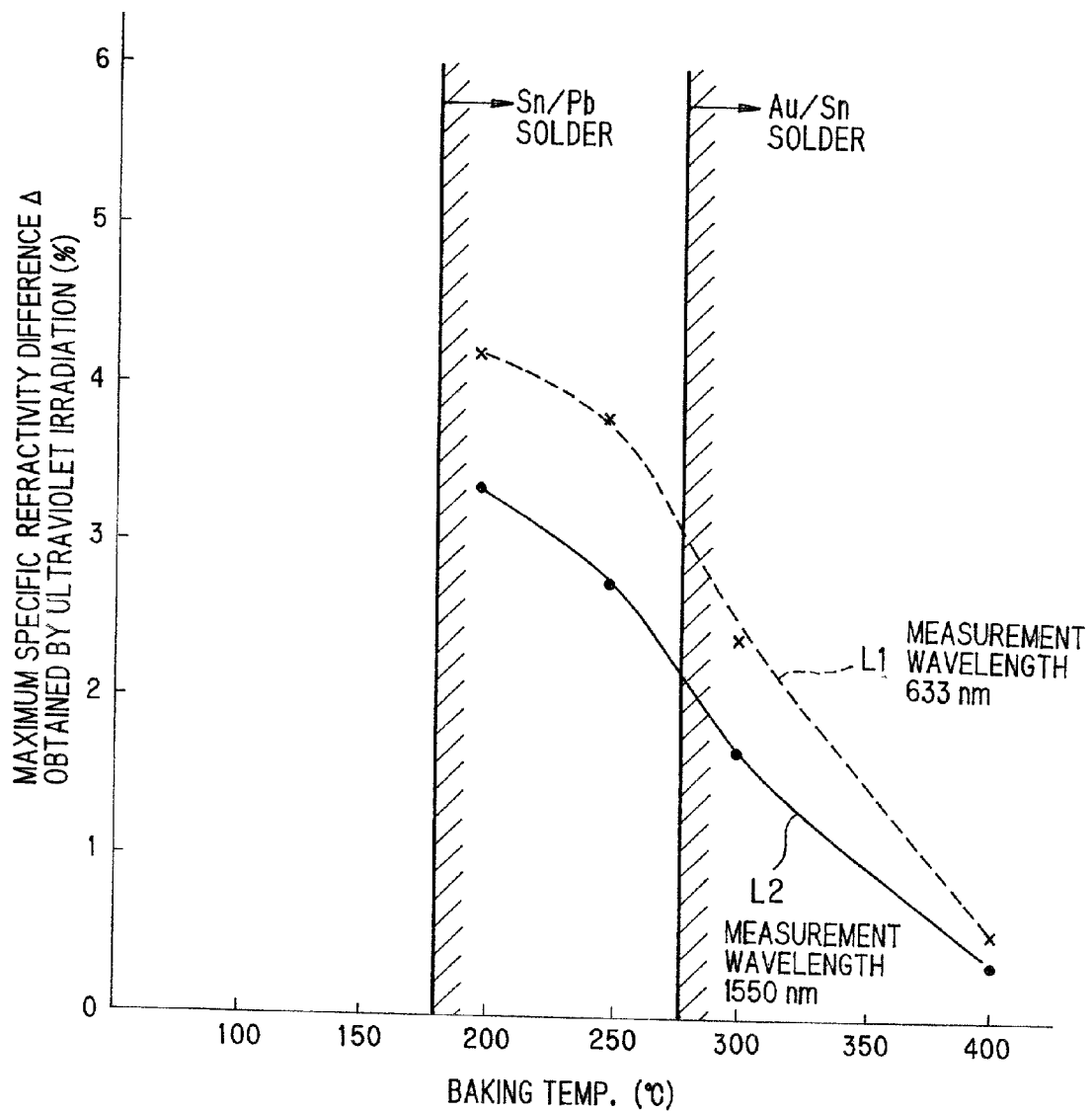
FIG. 17 is a characteristic curve showing the relationship between the maximum specific refractivity difference Δ provided by ultraviolet irradiation and the backing temperature.

A further reason is that, as shown in FIG. 17, the highest possible maximum specific refractivity difference Δ (Δ≧3%) obtained by ultraviolet irradiation should be realized. The curing temperature, which satisfies this requirement, is in the range of 180 to 230° C.

FIG. 17 is a characteristic curve showing the relationship between the maximum specific refractivity difference Δ provided by ultraviolet irradiation and the baking temperature. The baking temperature is plotted as the abscissa and the maximum specific refractivity difference as the ordinate.

Specifically, FIG. 17 shows the results of an experiment wherein a polymer layer for photobleaching is formed on a silicon substrate, is prebaked at 120° C. for 20 min, and is cured at a predetermined baking temperature for 20 min, and the temperature of the assembly is returned to room temperature, followed by the measurement of refractive index at a wavelength of 633 nm (L1) and at a wavelength of 1550 nm (L2). The amount of silicone added is 75% by weight. Solder is Sn/PB solder and Au/Sn solder.

As can be seen from FIG. 17, the maximum specific refractivity difference Δ is 3% or higher when the baking temperature (curing temperature) is 180 to 230° C. That is, the high maximum specific refractivity difference Δ can realize microminiture waveguide-type optical components.

Figure 18:
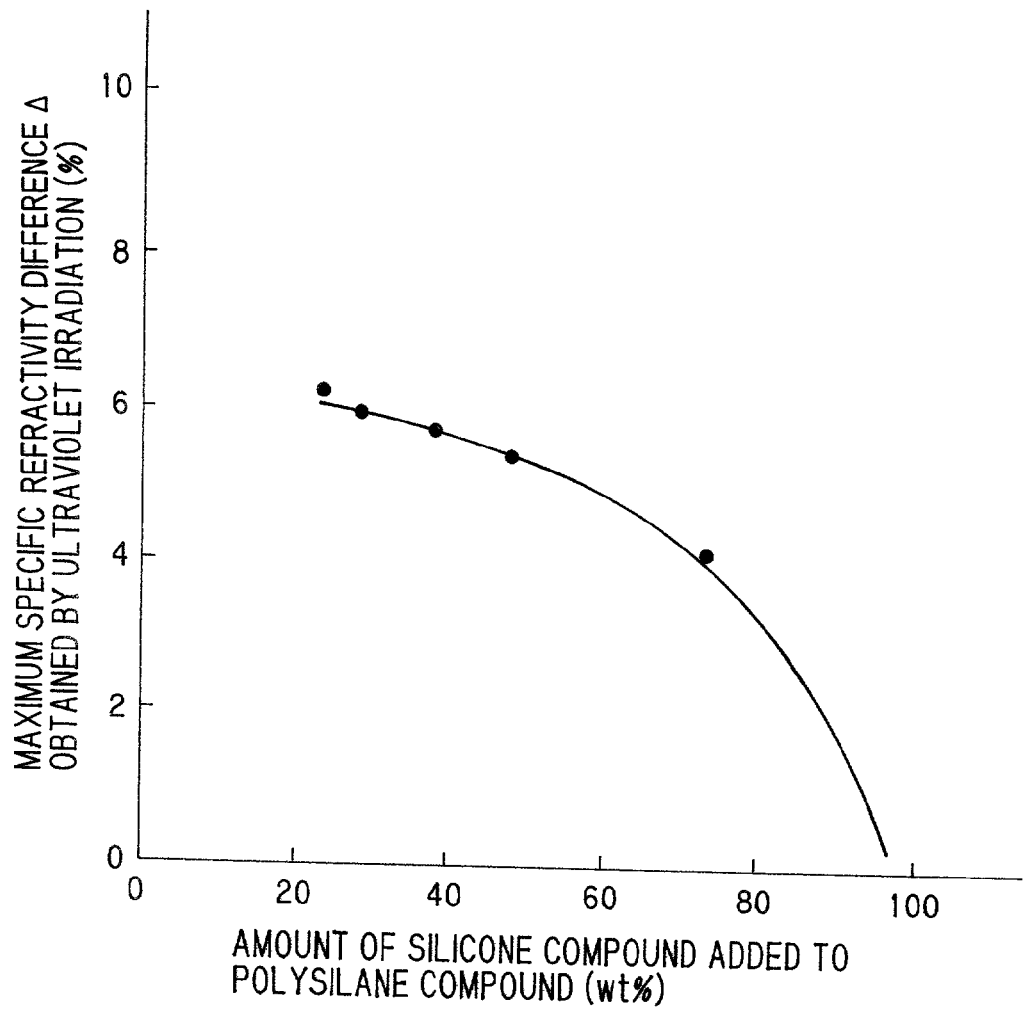
FIG. 18 is a characteristic curve showing the relationship between the amount of a silicone compound added to a branched polysilane compound constituting a polymer film and the maximum specific refractivity difference Δ of the polymer film provided by ultraviolet irradiation.

FIG. 18 is a characteristic curve showing the relationship between the amount of a silicone compound added to a branched polysilane compound constituting a polymer film and the maximum specific refractivity difference Δ of the polymer film provided by ultraviolet irradiation. In FIG. 18, the amount of a silicone compound added is plotted as the abscissa, and the maximum specific refractivity difference Δ as the ordinate.

In this case, the polymer film was heat treated at the same prebaking temperature as used in the polymer film in FIG. 17, was then baked at 200° C. for 20 min, and was measured for refractive index at a wavelength of 633 nm.

Figure 19:
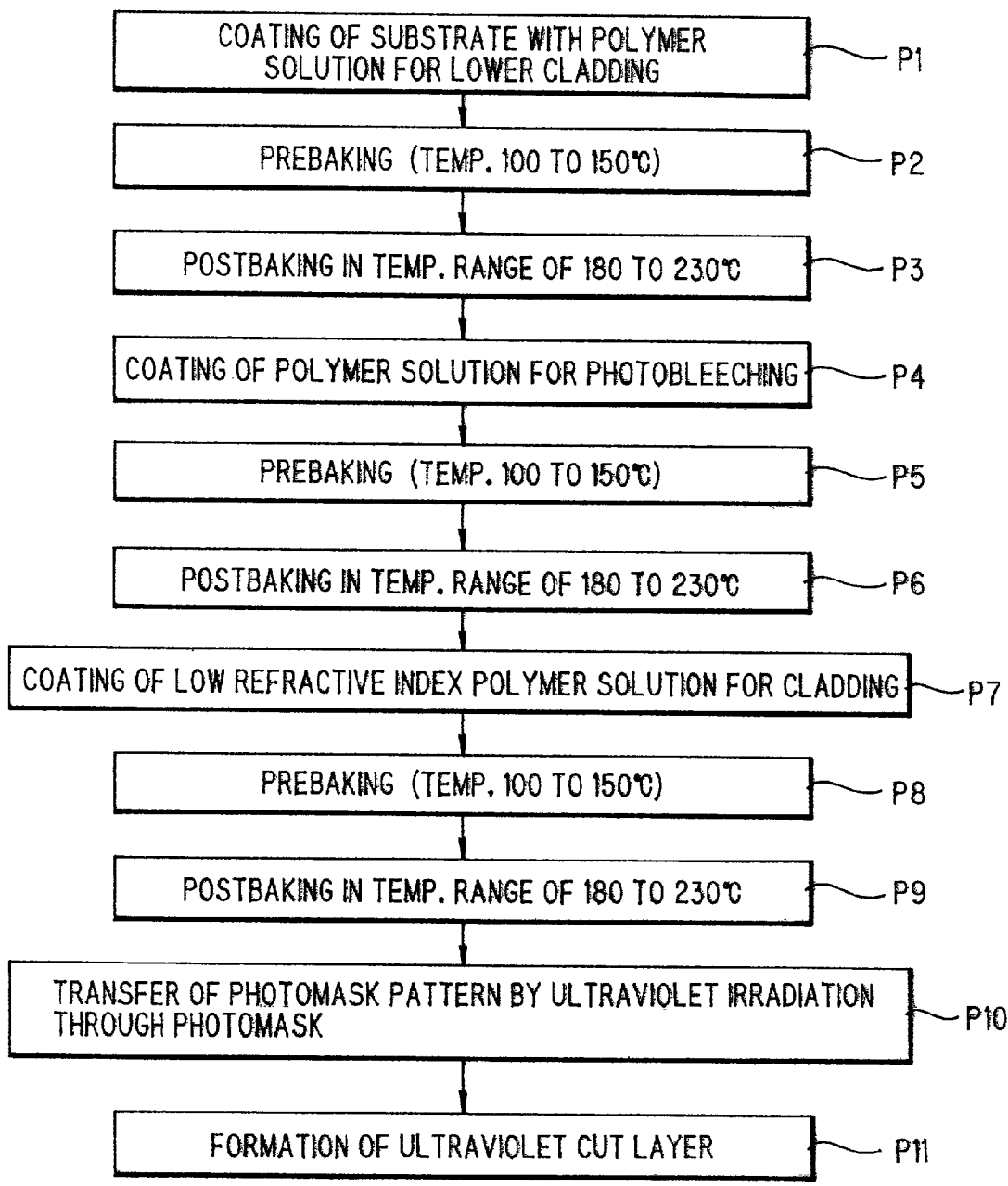
FIG. 19 is a process diagram showing a preferred embodiment of the production process of a polymer waveguide according to the invention.

FIG. 19 is a process diagram showing a preferred embodiment of the production process of a polymer waveguide according to the invention.

A polymer solution for a lower cladding layer is first coated onto a substrate. Substrates usable herein include semiconductor substrates such as silicon substrate, glass substrates such as quartz glass substrates, ceramic substrates such as alumina substrates, and printed boards. The polymer solution is a solution of a heat-curable silicone compound in an organic solvent such as toluene. This polymer solution is coated onto the substrate by a coating method such as spin coating or extrusion coating to form a lower cladding layer (step P1).

Subsequently, the lower cladding layer, together with the substrate, is prebaked in the temperature range of 100° C. to 150° C. for about 10 to 20 min (step P2).

The lower cladding layer is post-basked in the temperature range of 180° C. to 230° C. (curing temperature) for about 15 to 30 min (step P3).

A polymer solution for photobleaching is coated onto the lower cladding layer. As described above, a polymer for photobleaching is a branched polysilane compound with a predetermined amount of a silicone compound being added thereto. This material is dissolved in an organic solvent such as toluene to prepare a polymer solution which is then coated in the same manner as in step P1 (step P4).

After the coating of the polymer solution, prebaking and post-baking are carried out in the same manner as in steps 2 and 3. Specifically, the coating is prebaked at a temperature of 100 to 150° C. (step P5) and is then post-baked at a temperature of 180 to 230° C. (step P6).

A polymer solution for a cladding with a low refractive index is coated onto the polymer layer for photobleaching. The above-described polymer solution for a lower cladding is used as the polymer solution with a low refractive index (step P7).

After the coating of the polymer solution, the coating is prebaked at a temperature of 100 to 150° C. (step P8).

The prebaked coating is post-baked at a temperature of 180 to 230° C. to form an upper cladding layer (step P9).

After curing, a photomask with a desired pattern drawn thereon is placed on the upper cladding layer. Ultraviolet light is applied from above the photomask to form (transfer) a latent image of the mask pattern on the polymer layer for photobleaching. Upon the application of ultraviolet light, the refractive index of the area exposed to the ultraviolet light is lowered, while the refractive index of the area not exposed to the ultraviolet light remains unexchanged.

That is, core layers of a substantially rectangular section with a high refractive index are formed, and side cladding layers with a lowered refractive index are formed respectively on both sides of each core layer.

Parallel light is used as the ultraviolet light. When the thickness of the upper cladding layer is not more than 100 μm (actually several tens of μm), a satisfactory quantity of parallel light can be applied to the polymer layer for photobleaching (several μm to several tens of μm) (step P10).

Finally, an ultraviolet cut layer is formed on the upper cladding layer to complete the production of a polymer waveguide (step P11).

The steps P1 to P11 are preferably carried out in a yellow room.

Figure 20:
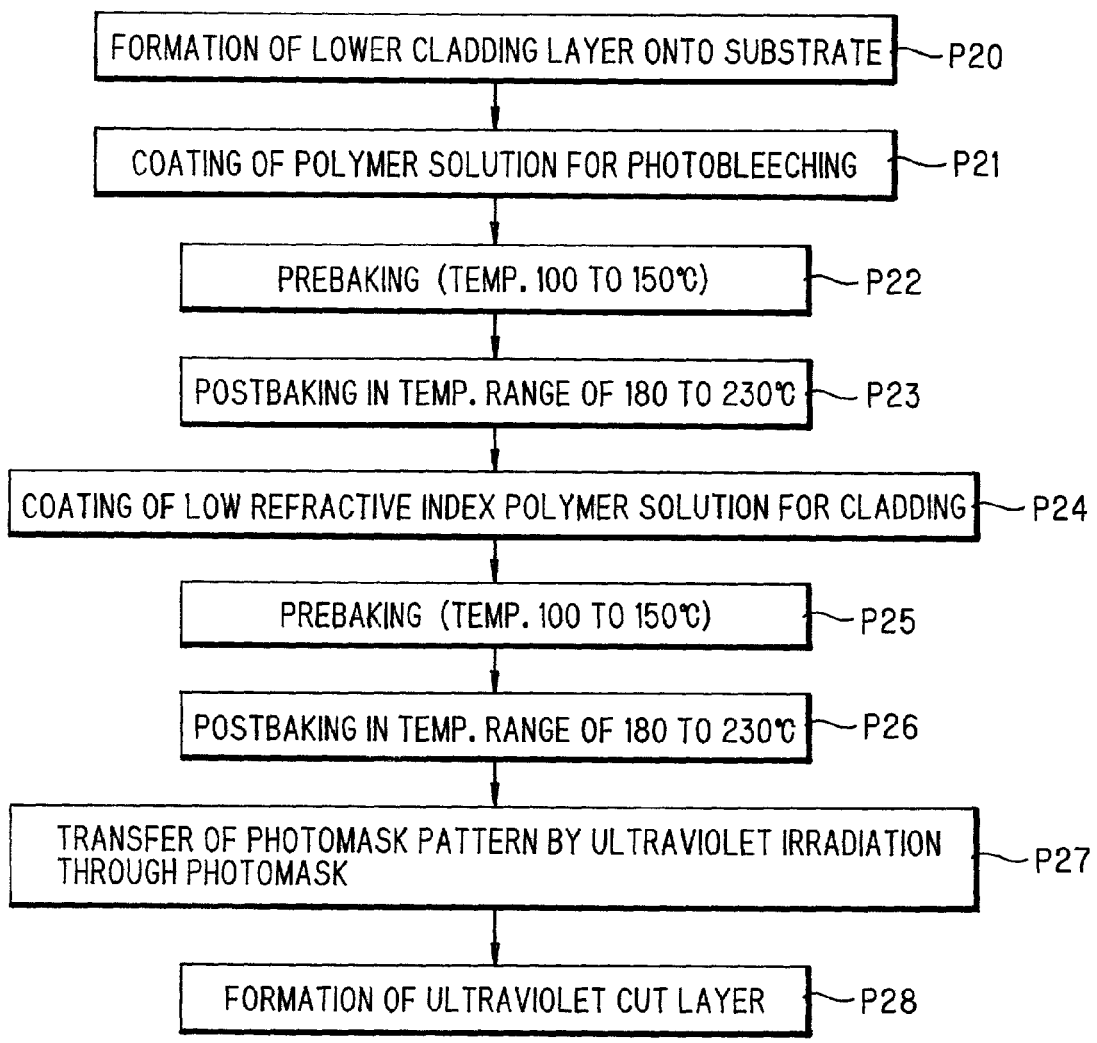
FIG. 20 is a process diagram showing another preferred embodiment of the production process of a polymer waveguide according to the invention.

FIG. 20 is a process diagram showing another preferred embodiment of the production process of a polymer waveguide according to the invention.

According to this process, a polymer waveguide is produced by forming, for example, an $SiO_2$ or fluorine-containing $SiO_2$ layer as a lower cladding layer on a substrate and then forming a polymer layer for photobleaching and an upper cladding layer on the lower cladding layer in the same manner as described in FIG. 19.

A lower cladding layer is first formed on a substrate (step P20).

A polymer solution for photobleaching is coated onto the lower cladding layer (step P21).

The coating for a core, together with the substrate, is prebaked at a temperature of 100 to 150° C. to cure the polymer layer (step P22).

The polymer layer for a core, together with the substrate, is post-baked at a temperature of 180 to 230° C. (step P23).

A polymer solution for a cladding with a low refractive index is coated onto the polymer layer (step P24).

The polymer layer for an upper cladding layer, together with the substrate, is prebaked at a temperature of 100 to 150° C. (step P25).

The polymer layer for an upper cladding layer is post-baked at a temperature of 180 to 230° C. (step P26).

A photomask pattern is transferred onto a polymer layer for a core by ultraviolet irradiation through a mask for photobleaching to simultaneously form core layers with a high refractive index and side cladding layers with a low refractive index (step P27).

An ultraviolet cut layer is formed on the upper cladding layer to complete the production of a polymer waveguide (step P28).

The steps P20 to P28 are preferably carried out in a yellow room.

The polymer waveguide shown in FIG. 16 was produced by the production process shown in FIG. 19. As a result, low loss characteristics of 0.12 dB/cm at a wavelength of 1300 nm could be realized. Light scattering characteristics in light propagation direction of the polymer waveguide were examined using an optical fiber while detecting streak light. As a result, it was found that an unnecessary light scattering center was absent and a large part of the loss was attributable to absorption loss of the polymer, indicating that highly homogeneous interfaces could be realized by the invention.

According to the first to fourth features of the invention, the following useful effects can be attained.

(1) A polymer waveguide with a low optical propagation loss by photobleaching can be realized which has very low temperature dependency of the refractive index up to a high temperature of about 250° C., because the addition of a silicone compound to a polysilane compound at a predetermined blending ratio can realize good stability of refractive index against heat and low optical propagation loss. Further, since the addition of a silicone compound can lower the refractive index, connection loss caused at the time of connection to a glass optical fiber can be lowered. Furthermore, the use of a branched polysilane compound as the polysilane compund could have contributed to lowered optical propagation loss. When the branched polysilane compound used has a degree of branching of not less than 2%, a waveguide having low optical propagation loss and no polarized wave dependency can be realized.

(2) A polymer material comprising a crosslinkable or alkoxy-containing silicone compound added to a branched polysilane compound can be easily dissolved in an organic solvent, such as toluene, to render the particle diameter very small and homogeneous. This can realize the formation of a low-loss polymer layer substantially free from light scattering center on various substrates. Further, when a photomask with a desired pattern drawn thereon is placed on the polymer layer with a homogeneous fine particle diameter followed by the application of ultraviolet light, a very accurate pattern can be formed. As a result, the interface between the core layer and the side cladding layer can be more homogenized. By virtue of this, a waveguide with a lower light scattering loss can be realized.

(3) The addition of a predetermined amount of a trichloromethyltriazine photoacid generator to a material with the above-described polysilane and silicone compound added Me thereto enables the refractive index to be kept at a constant value up to a higher temperature. Further, in this case, the refractive index can be lowered with good controllability by varying the dose of the ultraviolet light, and, at the same time, the sensitivity to a change in refractive index can be improved.

(4) The use of a silicone compound in the cladding layer with a low refractive index can improve the homogeneity of interface and adhesion between the core layer and the side cladding layer. In addition, since the difference in coefficient of thermal expansion between the cladding layer with a low refractive index and the polymer layer for photobleaching can be reduced, microcracking caused by the difference in coefficient of thermal expansion can be suppressed.

(5) The polymer waveguide with low optical propagation loss produced by photobleaching has very low temperature dependency of refractive index up to a high temperature of about 250° C. Therefore, upon soldering of electronic or optical components on the upper or lower side of the waveguide or within the waveguide, the refractive index of the waveguide remains substantially unchanged. This can realize various high-functional photoelectric composite devices.

(6) Low-loss waveguides with a high specific refractivity difference can be realized.

In summary, the first to fourth features of the invention can realize low-loss polymer waveguides, which cause no significant change in optical characteristics upon a change in ambient temperature, and a process for producing the same.

According to the fifth and sixth features of the invention, the following useful effects can be attained.

(1) Microstructure waveguides with a low light scattering loss and a high specific refractivity difference $\Delta$ ($\geqq$3%) can be realized without sacrificing the characteristics of the polymer layer for photobleaching. This is because the Si—Si bond as the main chain in the polymer layer for photobleaching does not occur, the phenyl group as the side chain does not decompose, a silicone compound is used in the lower cladding layer and the upper cladding layer, and a silicone compound is also incorporated into the polymer layer for photobleaching to provide good and uniform adhesion between the polymer layer and the lower and upper cladding layers. Further, the realization of microstructure waveguides with a low light scattering loss and a high specific refractivity difference $\Delta$ ($\geqq$3%) is based on finding of curing conditions under which the maximum specific refractivity difference $\Delta$ determined from the refractive index before and after ultraviolet irradiation is brought to 3% or more. Further, when the curing temperature is set at substantially Sn/Pb solder reflow temperature or above, electronic components or optical components can be soldered on the upper or lower side of the waveguide or within the waveguide.

(2) The incorporation of 40 to 90% by weight of a silicone compound into the polymer layer for photobleaching could have realized a high maximum specific refractivity difference $\Delta$ and, at the same time, could have realized good adhesion and homogeneity of interface between the polymer layer and the upper and lower cladding layers.

(3) The separation of the polymer layer for photobleaching or the cladding layer and the formation of an uneven layer and other unfavorable phenomena could have been prevented. This has contributed to lowered light scattering loss.

(4) When a polymer waveguide was experimentally prepared and was evaluated for propagation loss, the polymer waveguide could realize a low loss of 0.12 dB/cm at a wavelength of 1300 nm. Further, when light scattering characteristics in propagation direction of the polymer waveguide were examined using an optical fiber while detecting streak light, it was found that there was no light scattering center and a large part of the loss was attributable to absorption loss of the polymer layer.

In summary, the fifth and sixth features of the invention can realize a polymer waveguide, which has low loss and can withstand soldering, and a process for producing the same.

The invention has been described in detail with particular reference to preferred embodiments, but it will be understood that variations and modifications can be effected within the scope of the invention as set forth in the appended claims.

What is claimed is:

1. A polymer waveguide comprising:
   a lower cladding layer with a low refractive index;
   a core layer provided on the lower cladding layer, said core layer being formed of a polymer film with a high refractive index, said polymer film comprising a branched polysilane compound and a predetermined amount of a silicone compound and being cured at a temperature of 180 to 230° C.;
   a side cladding layer which has been formed by applying ultraviolet light to said polymer film in its portion located on both sides of the portion constituting the core layer to lower the refractive index of the polymer film; and
   an upper cladding layer provided on the core layer and the side cladding layer, said upper cladding layer being formed of a silicone compound with a low refractive index.

2. The polymer waveguide according to claim 1, wherein the maximum difference in specific refractivity between the core layer and the side cladding layer is at least 3%.

3. The polymer waveguide according to claim 1, wherein the branched polysilane compound is a compound wherein a silicon atom is combined to silicon atoms, as well as to a hydrocarbon group, an alkoxy group, or a hydrogen atom.

4. The polymer waveguide according to claim 1, wherein the branched polysilane compound has a degree of branching of not less than 2% and not more than 50%.

5. The polymer waveguide according to claim 1, wherein the silicone compound is crosslinkable or comprises an alkoxy group and a blending ratio of the silicone compound to the polysilane compound is 40 to 90% by weight.

6. The polymer waveguide according to claim 1, wherein the polymer film with a high refractive index contains a trichloromethyltriazine photoacid generator and a blending ratio of the trichloromethyltriazine photoacid generator to the polysilane compound is not less than 1% by weight and not more than 5.5% by weight.

7. The polymer waveguide according to claim 1, wherein the silicone compound constituting the upper cladding layer is a cured product of a heat-curable silicone compound.

8. The polymer waveguide according to claim 1, which further comprises an ultraviolet cut layer which is provided on the upper cladding layer.

9. The polymer waveguide according to claim 8, wherein said ultraviolet cut layer is disposed directly between a lower surface of said upper cladding layer and an upper surface of said side cladding layer.

10. The polymer waveguide according to claim 8, further comprising a second ultraviolet cut layer that is disposed directly between a lower surface of said side cladding layer and an upper surface of said lower cladding layer.

11. The polymer waveguide according to claim 1, further comprising a buffer layer disposed directly above said lower cladding layer, wherein said core layer comprises a plurality of core sub-layers that are disposed directly above said buffer layer and wherein said side cladding layer comprises a plurality of side cladding sub-layers that are disposed directly above said buffer layer, and wherein said none of said side cladding sub-layers are in direct contact with each other and none of said core sub-layers are in direct contact with each other.

12. The polymer waveguide according to claim 1, wherein the branched polysilane compound contains between 40% to 90% by weight of a crosslinkable or alkyl-containing silicone compound.

* * * * *